US010854231B2

(12) United States Patent
Kasada et al.

(10) Patent No.: US 10,854,231 B2
(45) Date of Patent: *Dec. 1, 2020

(54) MAGNETIC RECORDING MEDIUM HAVING CHARACTERIZED MAGNETIC LAYER AND MAGNETIC RECORDING AND REPRODUCING DEVICE

(71) Applicant: FUJIFILM Corporation, Tokyo (JP)

(72) Inventors: Norihito Kasada, Minami-ashigara (JP); Eiki Ozawa, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 81 days.

This patent is subject to a terminal disclaimer.

(21) Appl. No.: 16/142,560

(22) Filed: Sep. 26, 2018

(65) Prior Publication Data

US 2019/0103134 A1 Apr. 4, 2019

(30) Foreign Application Priority Data

Sep. 29, 2017 (JP) ................................. 2017-191665
Sep. 12, 2018 (JP) ................................. 2018-170192

(51) Int. Cl.
G11B 5/706 (2006.01)
G11B 5/708 (2006.01)
G11B 5/78 (2006.01)
G11B 5/714 (2006.01)
G11B 5/71 (2006.01)
G11B 5/84 (2006.01)
G11B 5/712 (2006.01)

(52) U.S. Cl.
CPC ........ *G11B 5/70678* (2013.01); *G11B 5/7085* (2013.01); *G11B 5/71* (2013.01); *G11B 5/712* (2013.01); *G11B 5/714* (2013.01); *G11B 5/78* (2013.01); *G11B 5/84* (2013.01)

(58) Field of Classification Search
None
See application file for complete search history.

(56) References Cited

U.S. PATENT DOCUMENTS

| | | | |
|---|---|---|---|
| 3,966,686 A | 6/1976 | Asakura et al. |
| 4,112,187 A | 9/1978 | Asakura et al. |
| 4,425,404 A | 1/1984 | Suzuki et al. |
| 4,693,930 A | 9/1987 | Kuo et al. |
| 4,746,569 A | 5/1988 | Takahashi et al. |
| 4,825,317 A | 4/1989 | Rausch |
| 5,006,406 A | 4/1991 | Kovacs et al. |
| 5,242,752 A | 9/1993 | Isobe et al. |
| 5,419,938 A | 5/1995 | Kagotani et al. |
| 5,445,881 A | 9/1995 | Irie |
| 5,474,814 A | 12/1995 | Komatsu et al. |
| 5,496,607 A | 3/1996 | Inaba et al. |
| 5,540,957 A | 7/1996 | Ueda et al. |
| 5,585,032 A | 12/1996 | Nakata et al. |
| 5,645,917 A | 7/1997 | Ejiri et al. |
| 5,689,384 A | 11/1997 | Albrecht et al. |
| 5,728,454 A | 3/1998 | Inaba et al. |
| 5,786,074 A | 6/1998 | Soui |
| 5,827,600 A | 10/1998 | Ejiri et al. |
| 5,835,314 A | 11/1998 | Moodera et al. |
| 6,099,957 A | 8/2000 | Yamamoto et al. |
| 6,183,606 B1 | 2/2001 | Kuo et al. |
| 6,207,252 B1 | 3/2001 | Shimomura |
| 6,228,461 B1 | 5/2001 | Sueki et al. |
| 6,254,964 B1 | 7/2001 | Saito et al. |
| 6,261,647 B1 | 7/2001 | Komatsu et al. |
| 6,268,043 B1 | 7/2001 | Koizumi et al. |
| 6,496,328 B1 | 12/2002 | Dugas |
| 6,579,826 B2 | 6/2003 | Furuya et al. |
| 6,649,256 B1 | 11/2003 | Buczek et al. |
| 6,686,022 B2 | 2/2004 | Takano et al. |
| 6,770,359 B2 | 8/2004 | Masaki |
| 6,791,803 B2 | 9/2004 | Saito et al. |
| 6,835,451 B2 | 12/2004 | Ejiri |
| 6,921,592 B2 | 7/2005 | Tani et al. |
| 6,939,606 B2 | 9/2005 | Hashimoto et al. |

(Continued)

FOREIGN PATENT DOCUMENTS

DE 101 46 429 A1 3/2002
EP 0 520 155 B1 8/1996

(Continued)

OTHER PUBLICATIONS

Advisory Action dated Jul. 5, 2018 in U.S. Appl. No. 14/838,663.
Office Action dated Apr. 26, 2017 which issued during the prosecution of U.S. Appl. No. 15/388,864.
Office Action dated Aug. 10, 2017, which issued during the prosecution of U.S. Appl. No. 14/870,618.
Office Action dated Aug. 3, 2018 which issued during the prosecution of U.S. Appl. No. 15/388,911.
Office Action dated Feb. 4, 2016 which issued during the prosecution of U.S. Appl. No. 14/753,227.
Office Action dated Jun. 7, 2018 which issued during the prosecution of U.S. Appl. No. 15/380,309.
Office Action dated May 2, 2018, which issued during the prosecution of U.S. Appl. No. 15/280,195.

(Continued)

*Primary Examiner* — Kevin M Bernatz
(74) *Attorney, Agent, or Firm* — Sughrue Mion, PLLC

(57) ABSTRACT

Provided are a magnetic recording medium, in which a magnetic layer includes ferromagnetic hexagonal ferrite powder, a binding agent, and an oxide abrasive, an intensity ratio Int(110)/Int(114) obtained by an X-ray diffraction analysis of the magnetic layer by using an In-Plane method is 0.5 to 4.0, a vertical squareness ratio of the magnetic recording medium is 0.65 to 1.00, a coefficient of friction measured regarding a base portion of a surface of the magnetic layer is equal to or smaller than 0.30, and an average particle diameter of the oxide abrasive obtained from a secondary ion image obtained by irradiating the surface of the magnetic layer with a focused ion beam is 0.04 μm to 0.08 μm, and a magnetic recording and reproducing device including this magnetic recording medium.

15 Claims, No Drawings

(56) References Cited

U.S. PATENT DOCUMENTS

| | | |
|---|---|---|
| 6,950,269 B1 | 9/2005 | Johnson |
| 6,994,925 B2 | 2/2006 | Masaki |
| 7,014,927 B2 | 3/2006 | Sueki et al. |
| 7,029,726 B1 | 4/2006 | Chen et al. |
| 7,153,366 B1 | 12/2006 | Chen et al. |
| 7,255,908 B2 | 8/2007 | Ishikawa et al. |
| 7,511,907 B2 | 3/2009 | Dugas et al. |
| 7,515,383 B2 | 4/2009 | Saito et al. |
| 7,656,602 B2 | 2/2010 | Iben et al. |
| 7,803,471 B1 | 9/2010 | Ota et al. |
| 7,839,599 B2 | 11/2010 | Bui et al. |
| 8,000,057 B2 | 8/2011 | Bui et al. |
| 8,318,242 B2 | 11/2012 | Bradshaw et al. |
| 8,524,108 B2 | 9/2013 | Hattori |
| 8,535,817 B2 * | 9/2013 | Imaoka .............. G11B 5/70 428/844 |
| 8,576,510 B2 | 11/2013 | Cherubini et al. |
| 8,681,451 B2 | 3/2014 | Harasawa et al. |
| 9,105,294 B2 | 8/2015 | Jensen et al. |
| 9,159,341 B2 | 10/2015 | Bradshaw et al. |
| 9,311,946 B2 | 4/2016 | Tanaka et al. |
| 9,324,343 B2 | 4/2016 | Bradshaw et al. |
| 9,495,985 B2 | 11/2016 | Biskeborn et al. |
| 9,530,444 B2 | 12/2016 | Kasada |
| 9,542,967 B2 | 1/2017 | Sekiguchi et al. |
| 9,564,161 B1 | 2/2017 | Cherubini et al. |
| 9,601,146 B2 | 3/2017 | Kasada et al. |
| 9,704,425 B2 | 7/2017 | Zhang et al. |
| 9,704,525 B2 | 7/2017 | Kasada |
| 9,704,527 B2 | 7/2017 | Kasada |
| 9,711,174 B2 | 7/2017 | Kasada et al. |
| 9,721,605 B2 | 8/2017 | Oyanagi et al. |
| 9,721,606 B2 | 8/2017 | Kasada |
| 9,721,607 B2 | 8/2017 | Tada et al. |
| 9,748,026 B2 | 8/2017 | Shirata |
| 9,773,519 B2 | 9/2017 | Kasada et al. |
| 9,779,772 B1 * | 10/2017 | Kasada .............. G11B 5/70 |
| 9,837,104 B1 | 12/2017 | Biskeborn |
| 9,837,116 B2 | 12/2017 | Ozawa et al. |
| 9,959,894 B2 | 5/2018 | Omura |
| 9,972,351 B1 | 5/2018 | Kaneko et al. |
| 9,978,414 B1 | 5/2018 | Kaneko et al. |
| 9,984,712 B1 | 5/2018 | Ozawa |
| 9,984,716 B1 | 5/2018 | Kaneko et al. |
| 10,008,230 B1 | 6/2018 | Ozawa et al. |
| 10,026,430 B2 * | 7/2018 | Kasada .............. G11B 5/70 |
| 10,026,433 B2 * | 7/2018 | Kasada .............. G11B 5/842 |
| 10,026,434 B2 | 7/2018 | Oyanagi et al. |
| 10,026,435 B2 | 7/2018 | Kasada et al. |
| 10,062,403 B1 | 8/2018 | Kasada et al. |
| 10,074,393 B2 | 9/2018 | Kaneko et al. |
| 10,134,433 B2 | 11/2018 | Kasada et al. |
| 10,170,144 B2 | 1/2019 | Ozawa et al. |
| 10,366,721 B2 * | 7/2019 | Kasada ............. G11B 20/1201 |
| 10,373,633 B2 * | 8/2019 | Kaneko ............. G11B 5/5926 |
| 10,373,639 B2 * | 8/2019 | Kasada .............. G11B 5/70 |
| 10,403,314 B2 * | 9/2019 | Kasada .............. G11B 5/78 |
| 10,403,316 B2 * | 9/2019 | Kasada ............. G11B 5/00817 |
| 10,403,317 B2 * | 9/2019 | Kasada .............. G11B 5/70 |
| 10,403,319 B2 * | 9/2019 | Kasada .............. G11B 5/78 |
| 10,410,665 B2 * | 9/2019 | Ozawa ............. G11B 5/00813 |
| 10,410,666 B2 * | 9/2019 | Kasada .............. G11B 5/82 |
| 10,475,481 B2 * | 11/2019 | Oyanagi ............ G11B 5/70 |
| 10,510,366 B2 * | 12/2019 | Kaneko ............. G11B 5/59633 |
| 10,515,657 B2 * | 12/2019 | Kasada .............. G11B 5/48 |
| 10,515,661 B2 * | 12/2019 | Kasada .............. G11B 5/584 |
| 10,522,180 B2 * | 12/2019 | Kasada ............. G11B 5/70626 |
| 10,546,602 B2 * | 1/2020 | Kasada .............. G11B 5/68 |
| 10,546,605 B2 * | 1/2020 | Ozawa ............. G11B 5/70615 |
| 10,643,647 B2 * | 5/2020 | Kasada ............. G11B 5/00817 |
| 2001/0038928 A1 | 11/2001 | Nakamigawa et al. |
| 2001/0053458 A1 | 12/2001 | Suzuki et al. |
| 2002/0072472 A1 | 7/2002 | Furuya et al. |
| 2002/0122339 A1 | 9/2002 | Takano et al. |
| 2003/0059649 A1 | 3/2003 | Saliba et al. |
| 2003/0091866 A1 | 5/2003 | Ejiri et al. |
| 2003/0124386 A1 | 7/2003 | Masaki |
| 2003/0128453 A1 | 7/2003 | Saito et al. |
| 2003/0170498 A1 | 9/2003 | Inoue |
| 2003/0228492 A1 | 12/2003 | Ejiri et al. |
| 2003/0228493 A1 | 12/2003 | Doushita et al. |
| 2004/0018388 A1 | 1/2004 | Kitamura et al. |
| 2004/0053074 A1 | 3/2004 | Jingu et al. |
| 2004/0072025 A1 | 4/2004 | Kishimoto et al. |
| 2004/0197605 A1 | 10/2004 | Seki et al. |
| 2004/0213948 A1 | 10/2004 | Saito et al. |
| 2004/0218304 A1 | 11/2004 | Goker et al. |
| 2004/0265643 A1 | 12/2004 | Ejiri |
| 2005/0057838 A1 | 3/2005 | Ohtsu |
| 2005/0153170 A1 | 7/2005 | Inoue et al. |
| 2005/0196645 A1 | 9/2005 | Doi et al. |
| 2005/0260456 A1 | 11/2005 | Hanai et al. |
| 2005/0260459 A1 | 11/2005 | Hanai et al. |
| 2005/0264935 A1 | 12/2005 | Sueki et al. |
| 2006/0008681 A1 | 1/2006 | Hashimoto et al. |
| 2006/0035114 A1 | 2/2006 | Kuse et al. |
| 2006/0056095 A1 | 3/2006 | Saitou |
| 2006/0068232 A1 | 3/2006 | Mikamo et al. |
| 2006/0187589 A1 | 8/2006 | Harasawa et al. |
| 2006/0232883 A1 | 10/2006 | Biskeborn et al. |
| 2007/0009769 A1 | 1/2007 | Kanazawa |
| 2007/0020489 A1 | 1/2007 | Yamazaki et al. |
| 2007/0020490 A1 | 1/2007 | Harasawa et al. |
| 2007/0224456 A1 | 9/2007 | Murao et al. |
| 2007/0230054 A1 | 10/2007 | Takeda et al. |
| 2007/0231606 A1 | 10/2007 | Hanai |
| 2008/0057351 A1 | 3/2008 | Meguro et al. |
| 2008/0144211 A1 | 6/2008 | Weber et al. |
| 2008/0152956 A1 | 6/2008 | Murayama et al. |
| 2008/0174897 A1 | 7/2008 | Bates et al. |
| 2008/0297950 A1 | 12/2008 | Noguchi et al. |
| 2008/0311308 A1 | 12/2008 | Lee et al. |
| 2009/0027812 A1 | 1/2009 | Noguchi et al. |
| 2009/0087689 A1 | 4/2009 | Doushita et al. |
| 2009/0161249 A1 | 6/2009 | Takayama et al. |
| 2009/0162701 A1 | 6/2009 | Jensen et al. |
| 2010/0000966 A1 | 1/2010 | Kamata et al. |
| 2010/0035086 A1 | 2/2010 | Inoue et al. |
| 2010/0035088 A1 | 2/2010 | Inoue |
| 2010/0053810 A1 | 3/2010 | Biskeborn et al. |
| 2010/0073816 A1 | 3/2010 | Komori et al. |
| 2010/0081011 A1 | 4/2010 | Nakamura |
| 2010/0134929 A1 | 6/2010 | Ito |
| 2010/0227201 A1 | 9/2010 | Sasaki et al. |
| 2010/0246073 A1 | 9/2010 | Katayama |
| 2011/0003241 A1 | 1/2011 | Kaneko et al. |
| 2011/0051280 A1 | 3/2011 | Karp et al. |
| 2011/0052908 A1 | 3/2011 | Imaoka |
| 2011/0077902 A1 | 3/2011 | Awezec et al. |
| 2011/0151281 A1 | 6/2011 | Inoue |
| 2011/0244272 A1 | 10/2011 | Suzuki et al. |
| 2012/0045664 A1 | 2/2012 | Tanaka et al. |
| 2012/0152891 A1 | 6/2012 | Brown et al. |
| 2012/0177951 A1 | 7/2012 | Yamazaki et al. |
| 2012/0183811 A1 | 7/2012 | Hattori et al. |
| 2012/0196156 A1 | 8/2012 | Suzuki |
| 2012/0243120 A1 | 9/2012 | Harasawa et al. |
| 2012/0244387 A1 | 9/2012 | Mori et al. |
| 2012/0251845 A1 | 10/2012 | Wang et al. |
| 2013/0029183 A1 | 1/2013 | Omura et al. |
| 2013/0084470 A1 | 4/2013 | Hattori et al. |
| 2013/0088794 A1 | 4/2013 | Cherubini et al. |
| 2013/0256584 A1 | 10/2013 | Yamazaki et al. |
| 2013/0260179 A1 | 10/2013 | Kasada et al. |
| 2013/0279040 A1 | 10/2013 | Cideciyan et al. |
| 2013/0286510 A1 | 10/2013 | Rothermel et al. |
| 2014/0011055 A1 | 1/2014 | Suzuki et al. |
| 2014/0130067 A1 | 5/2014 | Madison et al. |
| 2014/0139944 A1 | 5/2014 | Johnson et al. |
| 2014/0272474 A1 | 9/2014 | Kasada |
| 2014/0295214 A1 | 10/2014 | Tada et al. |
| 2014/0342189 A1 | 11/2014 | Tachibana et al. |
| 2014/0366990 A1 | 12/2014 | Lai et al. |
| 2014/0374645 A1 | 12/2014 | Kikuchi et al. |

(56) References Cited

U.S. PATENT DOCUMENTS

| | | |
|---|---|---|
| 2015/0043101 A1 | 2/2015 | Biskeborn et al. |
| 2015/0098149 A1 | 4/2015 | Bates et al. |
| 2015/0111066 A1 | 4/2015 | Terakawa et al. |
| 2015/0123026 A1 | 5/2015 | Masada et al. |
| 2015/0302879 A1 | 10/2015 | Holmberg et al. |
| 2015/0380036 A1 | 12/2015 | Kasada et al. |
| 2016/0061447 A1 | 3/2016 | Kobayashi |
| 2016/0064025 A1 | 3/2016 | Kurokawa et al. |
| 2016/0092315 A1 | 3/2016 | Ashida et al. |
| 2016/0093321 A1 | 3/2016 | Aoshima et al. |
| 2016/0093322 A1 | 3/2016 | Kasada et al. |
| 2016/0093323 A1 | 3/2016 | Omura |
| 2016/0180875 A1 | 6/2016 | Tanaka et al. |
| 2016/0189739 A1 | 6/2016 | Kasada et al. |
| 2016/0189740 A1 | 6/2016 | Oyanagi et al. |
| 2016/0247530 A1 | 8/2016 | Kasada |
| 2016/0260449 A1 | 9/2016 | Ahmad et al. |
| 2016/0276076 A1 | 9/2016 | Kasada |
| 2017/0032812 A1 | 2/2017 | Kasada |
| 2017/0053669 A1 | 2/2017 | Kasada |
| 2017/0053670 A1 | 2/2017 | Oyanagi et al. |
| 2017/0053671 A1 | 2/2017 | Kasada et al. |
| 2017/0058227 A1 | 3/2017 | Kondo et al. |
| 2017/0092315 A1 | 3/2017 | Ozawa et al. |
| 2017/0130156 A1 | 5/2017 | Kondo et al. |
| 2017/0178675 A1 | 6/2017 | Kasada |
| 2017/0178676 A1 | 6/2017 | Kasada |
| 2017/0178677 A1 | 6/2017 | Kasada |
| 2017/0186456 A1 | 6/2017 | Tada et al. |
| 2017/0186460 A1 | 6/2017 | Kasada et al. |
| 2017/0221513 A1 | 8/2017 | Hiroi et al. |
| 2017/0221516 A1 | 8/2017 | Oyanagi et al. |
| 2017/0221517 A1 | 8/2017 | Ozawa et al. |
| 2017/0249963 A1* | 8/2017 | Oyanagi .................. G11B 5/71 |
| 2017/0249964 A1 | 8/2017 | Kasada et al. |
| 2017/0249965 A1 | 8/2017 | Kurokawa et al. |
| 2017/0249966 A1 | 8/2017 | Tachibana et al. |
| 2017/0287517 A1 | 10/2017 | Hosoya et al. |
| 2017/0355022 A1 | 12/2017 | Kaneko et al. |
| 2017/0358318 A1 | 12/2017 | Kasada et al. |
| 2017/0372726 A1 | 12/2017 | Kasada et al. |
| 2017/0372727 A1 | 12/2017 | Kasada et al. |
| 2017/0372736 A1 | 12/2017 | Kaneko et al. |
| 2017/0372737 A1 | 12/2017 | Oyanagi et al. |
| 2017/0372738 A1 | 12/2017 | Kasada |
| 2017/0372739 A1 | 12/2017 | Ozawa et al. |
| 2017/0372740 A1 | 12/2017 | Ozawa et al. |
| 2017/0372741 A1 | 12/2017 | Kurokawa et al. |
| 2017/0372742 A1 | 12/2017 | Kaneko et al. |
| 2017/0372743 A1 | 12/2017 | Kasada et al. |
| 2017/0372744 A1 | 12/2017 | Ozawa et al. |
| 2018/0061446 A1 | 3/2018 | Kasada |
| 2018/0061447 A1 | 3/2018 | Kasada |
| 2018/0082710 A1* | 3/2018 | Tada .................. G11B 5/7085 |
| 2018/0137887 A1 | 5/2018 | Sekiguchi et al. |
| 2018/0182417 A1 | 6/2018 | Kaneko et al. |
| 2018/0182422 A1 | 6/2018 | Kawakami et al. |
| 2018/0182425 A1 | 6/2018 | Kasada et al. |
| 2018/0182426 A1 | 6/2018 | Ozawa et al. |
| 2018/0182427 A1 | 6/2018 | Kasada et al. |
| 2018/0182428 A1* | 6/2018 | Kasada .................. G11B 5/78 |
| 2018/0182429 A1 | 6/2018 | Kasada et al. |
| 2018/0182430 A1 | 6/2018 | Ozawa et al. |
| 2018/0240475 A1 | 8/2018 | Kasada |
| 2018/0240476 A1 | 8/2018 | Kasada et al. |
| 2018/0240478 A1 | 8/2018 | Kasada et al. |
| 2018/0240479 A1 | 8/2018 | Kasada et al. |
| 2018/0240481 A1 | 8/2018 | Kasada et al. |
| 2018/0240488 A1 | 8/2018 | Kasada |
| 2018/0240489 A1 | 8/2018 | Kasada et al. |
| 2018/0240490 A1 | 8/2018 | Kurokawa et al. |
| 2018/0240491 A1 | 8/2018 | Ozawa et al. |
| 2018/0240492 A1 | 8/2018 | Kasada |
| 2018/0240493 A1 | 8/2018 | Tada et al. |
| 2018/0240494 A1 | 8/2018 | Kurokawa et al. |
| 2018/0240495 A1 | 8/2018 | Kasada |
| 2018/0286439 A1 | 10/2018 | Ozawa et al. |
| 2018/0286442 A1 | 10/2018 | Ozawa et al. |
| 2018/0286443 A1 | 10/2018 | Ozawa et al. |
| 2018/0286444 A1 | 10/2018 | Kasada et al. |
| 2018/0286446 A1* | 10/2018 | Ozawa .................. G11B 5/712 |
| 2018/0286447 A1 | 10/2018 | Ozawa et al. |
| 2018/0286448 A1 | 10/2018 | Ozawa et al. |
| 2018/0286449 A1 | 10/2018 | Kasada et al. |
| 2018/0286450 A1 | 10/2018 | Kasada et al. |
| 2018/0286451 A1 | 10/2018 | Ozawa et al. |
| 2018/0286452 A1 | 10/2018 | Ozawa et al. |
| 2018/0286453 A1 | 10/2018 | Kasada et al. |
| 2018/0301165 A1 | 10/2018 | Oyanagi et al. |
| 2018/0350398 A1 | 12/2018 | Kawakami et al. |
| 2018/0350400 A1 | 12/2018 | Kaneko et al. |
| 2018/0358042 A1 | 12/2018 | Kasada et al. |
| 2018/0374507 A1 | 12/2018 | Kasada |
| 2019/0027167 A1* | 1/2019 | Tada .................. G11B 5/70 |
| 2019/0027168 A1* | 1/2019 | Kasada .................. G11B 5/7085 |
| 2019/0027171 A1* | 1/2019 | Kasada .................. G11B 5/70678 |
| 2019/0027172 A1* | 1/2019 | Kasada .................. G11B 5/735 |
| 2019/0027174 A1* | 1/2019 | Tada .................. G11B 5/735 |
| 2019/0027175 A1* | 1/2019 | Kurokawa .................. G11B 5/716 |
| 2019/0027176 A1* | 1/2019 | Kurokawa .................. G11B 5/70678 |
| 2019/0027177 A1 | 1/2019 | Kasada |
| 2019/0027178 A1* | 1/2019 | Kasada .................. G11B 5/70 |
| 2019/0027179 A1* | 1/2019 | Ozawa .................. G11B 5/70 |
| 2019/0027180 A1* | 1/2019 | Kasada .................. G11B 5/716 |
| 2019/0027181 A1* | 1/2019 | Ozawa .................. G11B 5/71 |
| 2019/0035424 A1 | 1/2019 | Endo |
| 2019/0051325 A1 | 2/2019 | Kasada et al. |
| 2019/0088278 A1 | 3/2019 | Kasada et al. |
| 2019/0096437 A1 | 3/2019 | Ozawa et al. |
| 2019/0103130 A1 | 4/2019 | Kasada et al. |
| 2019/0103131 A1* | 4/2019 | Kasada .................. G11B 5/00813 |
| 2019/0103133 A1* | 4/2019 | Ozawa .................. G11B 5/712 |
| 2019/0103134 A1* | 4/2019 | Kasada .................. G11B 5/72 |
| 2019/0103135 A1* | 4/2019 | Ozawa .................. G11B 5/78 |
| 2019/0130936 A1 | 5/2019 | Kaneko et al. |
| 2019/0259416 A1 | 8/2019 | Kawakami et al. |
| 2019/0295587 A1 | 9/2019 | Kasada |
| 2019/0295590 A1 | 9/2019 | Kaneko et al. |
| 2019/0304496 A1 | 10/2019 | Fujimoto |
| 2020/0005814 A1 | 1/2020 | Kasada et al. |
| 2020/0005818 A1 | 1/2020 | Kasada et al. |
| 2020/0005822 A1* | 1/2020 | Kasada .................. G11B 5/70678 |
| 2020/0005827 A1* | 1/2020 | Ozawa .................. G11B 20/10046 |
| 2020/0035262 A1* | 1/2020 | Kasada .................. G11B 5/706 |

FOREIGN PATENT DOCUMENTS

| | | |
|---|---|---|
| GB | 2495356 A | 4/2013 |
| JP | 61-11924 A | 1/1986 |
| JP | 61-139923 A | 6/1986 |
| JP | 61-139932 A | 6/1986 |
| JP | 63-129519 A | 6/1988 |
| JP | 63-249932 A | 10/1988 |
| JP | 63-298813 A | 12/1988 |
| JP | 64-057422 A | 3/1989 |
| JP | 64-60819 A | 3/1989 |
| JP | 1-276424 A | 11/1989 |
| JP | 2-227821 A | 9/1990 |
| JP | 5-258283 A | 10/1993 |
| JP | 5-298653 A | 11/1993 |
| JP | 7-57242 A | 3/1995 |
| JP | 9-73626 A | 3/1997 |
| JP | 11-110743 A | 4/1999 |
| JP | 11-175949 A | 7/1999 |
| JP | 11-259849 A | 9/1999 |
| JP | 11-273051 A | 10/1999 |
| JP | 2000-251240 A | 9/2000 |
| JP | 2002-157726 A | 5/2002 |
| JP | 2002-298332 A | 10/2002 |
| JP | 2002-329605 A | 11/2002 |
| JP | 2002-367142 A | 12/2002 |
| JP | 2002-367318 A | 12/2002 |
| JP | 2003-77116 A | 3/2003 |
| JP | 2003-323710 A | 11/2003 |

(56) References Cited

FOREIGN PATENT DOCUMENTS

| | | |
|---|---|---|
| JP | 2004-5793 A | 1/2004 |
| JP | 2004-005820 A | 1/2004 |
| JP | 2004-103186 A | 4/2004 |
| JP | 2004-114492 A | 4/2004 |
| JP | 2004-133997 A | 4/2004 |
| JP | 2004-185676 A | 7/2004 |
| JP | 2005-038579 A | 2/2005 |
| JP | 2005-092967 A | 4/2005 |
| JP | 2005-243063 A | 9/2005 |
| JP | 2005-243162 A | 9/2005 |
| JP | 2006-92672 A | 4/2006 |
| JP | 2006-286114 A | 10/2006 |
| JP | 2007-265555 A | 10/2007 |
| JP | 2007-273039 A | 10/2007 |
| JP | 2007-287310 A | 11/2007 |
| JP | 2007-297427 A | 11/2007 |
| JP | 2007-305197 A | 11/2007 |
| JP | 2008-047276 A | 2/2008 |
| JP | 2008-243317 A | 10/2008 |
| JP | 2009-245515 A | 10/2009 |
| JP | 2009-283082 A | 12/2009 |
| JP | 2010-036350 A | 2/2010 |
| JP | 2010-49731 A | 3/2010 |
| JP | 2011-48878 A | 3/2011 |
| JP | 2011-138566 A | 7/2011 |
| JP | 2011-187142 A | 9/2011 |
| JP | 2011-210288 A | 10/2011 |
| JP | 2011-225417 A | 11/2011 |
| JP | 2012-38367 A | 2/2012 |
| JP | 2012-043495 A | 3/2012 |
| JP | 2012-203955 A | 10/2012 |
| JP | 2013-25853 A | 2/2013 |
| JP | 2013-77360 A | 4/2013 |
| JP | 2013-164889 A | 8/2013 |
| JP | 2014-15453 A | 1/2014 |
| JP | 2014-179149 A | 9/2014 |
| JP | 2015-39801 A | 3/2015 |
| JP | 2015-111484 A | 6/2015 |
| JP | 2016-15183 A | 1/2016 |
| JP | 2016-502224 A | 1/2016 |
| JP | 2016-051493 A | 4/2016 |
| JP | 2016-071912 A | 5/2016 |
| JP | 2016-71926 A | 5/2016 |
| JP | 2016-126817 A | 7/2016 |
| JP | 2016-139451 A | 8/2016 |
| JP | 2016-177851 A | 10/2016 |
| JP | 2017-041291 A | 2/2017 |

OTHER PUBLICATIONS

Office Action dated May 4, 2018, which issued during the prosecution of U.S. Appl. No. 15/422,944.
Office Action dated May 4, 2018, which issued during the prosecution of U.S. Appl. No. 15/625,428.
Office Action dated May 7, 2018, which issued during the prosecution of U.S. Appl. No. 15/624,792.
Office Action dated May 7, 2018, which issued during the prosecution of U.S. Appl. No. 15/624,897.
Office Action dated May 7, 2018, which issued during the prosecution of U.S. Appl. No. 15/626,832.
Office Action dated Nov. 16, 2016 which issued during the prosecution of U.S. Appl. No. 15/072,550.
Office Action dated Oct. 12, 2018, which issued during the prosecution of U.S. Appl. No. 15/626,355.
Office Action dated Oct. 12, 2018, which issued during the prosecution of U.S. Appl. No. 15/627,696.
Office Action dated Oct. 15, 2018, which issued during the prosecution of U.S. Appl. No. 15/619,012.
Office Action dated Oct. 22, 2018, which issued during the prosecution of U.S. Appl. No. 15/854,439.
Office Action dated Oct. 9, 2018, which issued during the prosecution of U.S. Appl. No. 15/628,814.
Office Action dated Sep. 24, 2018, which issued during the prosecution of U.S. Appl. No. 15/690,400.
Office Action dated Sep. 27, 2018, which issued during the prosecution of U.S. Appl. No. 15/690,906.
Office Action dated Sep. 27, 2018, which issued during the prosecution of U.S. Appl. No. 15/854,383.
Office Action dated Aug. 23, 2018 from the United States Patent and Trademark Office in U.S. Appl. No. 15/614,876.
Office Action dated Aug. 23, 2018 from the United States Patent and Trademark Office in U.S. Appl. No. 15/621,464.
Office Action dated Aug. 23, 2018 from the United States Patent and Trademark Office in U.S. Appl. No. 15/626,720.
Office Action dated Aug. 24, 2018 from the United States Patent and Trademark Office in U.S. Appl. No. 15/620,916.
Office Action dated Aug. 3, 2018 from the United States Patent and Trademark Office in U.S. Appl. No. 15/380,336.
Office Action dated Dec. 5, 2016 from the United States Patent and Trademark Office in U.S. Appl. No. 14/978,834.
Office Action dated Dec. 6, 2016 from the United States Patent and Trademark Office in U.S. Appl. No. 14/757,555.
Office Action dated Jun. 9, 2017 which issued during the prosecution of U.S. Appl. No. 15/388,864.
Office Action dated May 30, 2018 which issued during the prosecution of U.S. Appl. No. 15/388,911.
Office Action dated Nov. 18, 2016 which issued during the prosecution of U.S. Appl. No. 14/753,227.
Office Action dated Aug. 15, 2016 which issued during the prosecution of U.S. Appl. No. 14/753,227.
"Introduction to TMR Magnetic Sensors", Anonymous, Mar. 12, 2015, MR Sensor Technology, pp. 1-5 (Year: 2015).
Notice of Allowance dated Apr. 25, 2017 which issued during the prosecution of U.S. Appl. No. 15/072,550.
Notice of Allowance dated Apr. 27, 2017, which issued during the prosecution of U.S. Appl. No. 15/052,115.
Notice of Allowance dated Apr. 5, 2018, which issued during the prosecution of U.S. Appl. No. 14/867,752.
Notice of Allowance dated Aug. 28, 2018 from the US Patent & Trademark Office in U.S. Appl. No. 15/422,821.
Notice of Allowance dated Aug. 30, 2017, which issued during the prosecution of U.S. Appl. No. 15/466,143.
Notice of Allowance dated Aug. 6, 2018, which issued during the prosecution of U.S. Appl. No. 15/920,768.
Notice of Allowance dated Aug. 9, 2018, which issued during the prosecution of U.S. Appl. No. 15/920,563.
Notice of Allowance dated Dec. 2, 2016 which issued during the prosecution of U.S. Appl. No. 14/753,227.
Notice of Allowance dated Dec. 3, 2018, which issued during the prosecution of U.S. Appl. No. 15/920,518.
Notice of Allowance dated Dec. 4, 2018, which issued during the prosecution of U.S. Appl. No. 15/625,428.
Notice of Allowance dated Feb. 14, 2018, which issued during the prosecution of U.S. Appl. No. 14/870,618.
Notice of Allowance dated Jul. 12, 2017 which issued during the prosecution of U.S. Appl. No. 15/388,864.
Notice of Allowance dated Jul. 13, 2018, which issued during the prosecution of U.S. Appl. No. 15/920,782.
Notice of Allowance dated Jun. 2, 2017, which issued during the prosecution of U.S. Appl. No. 15/218,190.
Notice of Allowance dated Jun. 28, 2017, which issued during the prosecution of U.S. Appl. No. 15/464,991.
Notice of Allowance dated Mar. 14, 2018, which issued during the prosecution of U.S. Appl. No. 15/854,474.
Notice of Allowance dated Mar. 16, 2018 which issued during the prosecution of U.S. Appl. No. 15/854,410.
Notice of Allowance dated May 10, 2018 which issued during the prosecution of U.S. Appl. No. 15/615,871.
Notice of Allowance dated May 8, 2017, which issued during the prosecution of U.S. Appl. No. 14/757,555.
Notice of Allowance dated May 8, 2017, which issued during the prosecution of U.S. Appl. No. 14/978,834.
Notice of Allowance dated Oct. 11, 2018, which issued during the prosecution of U.S. Appl. No. 15/380,336.

(56) References Cited

OTHER PUBLICATIONS

Notice of Allowance dated Oct. 11, 2018, which issued during the prosecution of U.S. Appl. No. 15/422,944.
Notice of Allowance dated Oct. 11, 2018, which issued during the prosecution of U.S. Appl. No. 15/624,792.
Notice of Allowance dated Oct. 11, 2018, which issued during the prosecution of U.S. Appl. No. 15/624,897.
Notice of Allowance dated Oct. 12, 2018, which issued during the prosecution of U.S. Appl. No. 15/626,832.
Notice of Allowance dated Oct. 6, 2016, which issued during the prosecution of U.S. Appl. No. 14/209,065.
Notice of Allowance dated Sep. 24, 2018, which issued during the prosecution of U.S. Appl. No. 15/854,438.
Notice of Allowance dated Sep. 4, 2018, which issued during the prosecution of U.S. Appl. No. 15/625,428.
Notice of Allowance dated Apr. 16, 2019 in U.S. Appl. No. 15/625,428.
Notice of Allowance dated Apr. 30, 2019 in U.S. Appl. No. 15/380,309.
Notice of Allowance dated Aug. 27, 2018 in U.S. Appl. No. 15/920,635.
Notice of Allowance dated Jan. 10, 2019 in U.S. Appl. No. 15/848,173.
Notice of Allowance dated Jan. 17, 2019 in U.S. Appl. No. 15/422,944.
Notice of Allowance dated Jan. 17, 2019 in U.S. Appl. No. 15/626,720.
Notice of Allowance dated Jan. 30, 2019 in U.S. Appl. No. 15/854,409.
Notice of Allowance dated Jul. 16, 2019 in U.S. Appl. No. 15/900,144.
Notice of Allowance dated Jul. 31, 2019 in U.S. Appl. No. 16/100,289.
Notice of Allowance dated Jul. 31, 2019 in U.S. Appl. No. 16/143,646.
Notice of Allowance dated Jun. 25, 2019 in U.S. Appl. No. 15/620,916.
Notice of Allowance dated Jun. 27, 2019 in U.S. Appl. No. 15/854,439.
Notice of Allowance dated Jun. 6, 2019 in U.S. Appl. No. 15/854,383.
Notice of Allowance dated Mar. 13, 2019 in U.S. Appl. No. 16/100,289.
Notice of Allowance dated Mar. 14, 2018 in U.S. Appl. No. 15/854,329.
Notice of Allowance dated Mar. 18, 2019 in U.S. Appl. No. 15/626,355.
Notice of Allowance dated Mar. 18, 2019 in U.S. Appl. No. 15/628,814.
Notice of Allowance dated Mar. 5, 2019 in U.S. Appl. No. 16/009,603.
Notice of Allowance dated May 13, 2019 in U.S. Appl. No. 15/900,379.
Notice of Allowance dated May 14, 2019 in U.S. Appl. No. 15/422,821.
Notice of Allowance dated May 14, 2019 in U.S. Appl. No. 15/900,164.
Notice of Allowance dated May 15, 2019 in U.S. Appl. No. 15/900,106.
Notice of Allowance dated May 15, 2019 in U.S. Appl. No. 15/900,242.
Notice of Allowance dated May 16, 2019 in U.S. Appl. No. 15/614,876.
Notice of Allowance dated May 16, 2019 in U.S. Appl. No. 15/621,464.
Notice of Allowance dated May 24, 2019 in U.S. Appl. No. 15/900,345.
Notice of Allowance dated May 24, 2019 in U.S. Appl. No. 16/143,646.
Notice of Allowance dated May 28, 2019 in U.S. Appl. No. 15/920,616.
Notice of Allowance dated May 29, 2019 in U.S. Appl. No. 15/900,160.
Notice of Allowance dated May 29, 2019 in U.S. Appl. No. 15/900,334.
Notice of Allowance dated May 30, 2019 in U.S. Appl. No. 15/900,230.
Office Action dated Apr. 19, 2018, which issued during the prosecution of U.S. Appl. No. 15/854,438.
Office Action dated Dec. 14, 2018, which issued during the prosecution of U.S. Appl. No. 15/920,517.
Office Action dated Dec. 17, 2018, which issued during the prosecution of U.S. Appl. No. 15/920,515.
Office Action dated Dec. 17, 2018, which issued during the prosecution of U.S. Appl. No. 15/920,533.
Office Action dated Dec. 17, 2018, which issued during the prosecution of U.S. Appl. No. 15/920,538.
Office Action dated Dec. 17, 2018, which issued during the prosecution of U.S. Appl. No. 15/920,544.
Office Action dated Dec. 20, 2018, which issued during the prosecution of U.S. Appl. No. 15/900,164.
Office Action dated Dec. 21, 2018, which issued during the prosecution of U.S. Appl. No. 15/900,230.
Office Action dated Feb. 25, 2016, which issued during the prosecution of U.S. Appl. No. 14/867,752.
Office Action dated Jan. 27, 2015 from the Japanese Patent Office in Japanese Application No. 2013-053543.
Office Action dated Jan. 31, 2018, which issued during the prosecution of U.S. Appl. No. 14/867,752.
Office Action dated Jul. 3, 2018, which issued during the prosecution of U.S. Appl. No. 15/920,518.
Office Action dated Jul. 6, 2015, which issued during the prosecution of U.S. Appl. No. 14/209,065.
Office Action dated Jul. 6, 2018 from the United States Patent and Trademark Office in U.S. Appl. No. 15/848,173.
Office Action dated Mar. 13, 2015, which issued during the prosecution of U.S. Appl. No. 14/209,065.
Office Action dated Mar. 16, 2017, which issued during the prosecution of U.S. Appl. No. 14/867,752.
Office Action dated Mar. 24, 2016, which issued during the prosecution of U.S. Appl. No. 14/209,065.
Office Action dated May 4, 2018 which issued during the prosecution of U.S. Appl. No. 15/422,821.
Office Action dated Nov. 28, 2018, which issued during the prosecution of U.S. Appl. No. 15/899,587.
Office Action dated Nov. 28, 2018, which issued during the prosecution of U.S. Appl. No. 15/900,080.
Office Action dated Nov. 28, 2018, which issued during the prosecution of U.S. Appl. No. 15/900,144.
Office Action dated Nov. 29, 2018, which issued during the prosecution of U.S. Appl. No. 15/380,309.
Office Action dated Nov. 29, 2018, which issued during the prosecution of U.S. Appl. No. 15/422,821.
Office Action dated Nov. 8, 2016 from the Japanese Patent Office in Japanese Application No. 2014-199022.
Office Action dated Oct. 15, 2018, which issued during the prosecution of U.S. Appl. No. 15/854,403.
Office Action dated Oct. 19, 2016, which issued during the prosecution of U.S. Appl. No. 14/867,752.
Office Action dated Oct. 3, 2018 from the United States Patent and Trademark Office in U.S. Appl. No. 15/280,195.
Office Action dated Sep. 10, 2015, which issued during the prosecution of U.S. Appl. No. 14/209,065.
Office Action dated Sep. 19, 2014, which issued during the prosecution of U.S. Appl. No. 14/209,065.
Office Action dated Sep. 26, 2017 issued by the Japanese Patent Office in JP Appln. No. 2014-265723.
Office Action dated Sep. 26, 2017 issued by the Japanese Patent Office in JP Appln. No. 2015-249264.
Office Action dated Sep. 28, 2018, which issued during the prosecution of U.S. Appl. No. 15/854,409.
Office Action dated Sep. 7, 2017, which issued during the prosecution of U.S. Appl. No. 14/867,752.
Office Action dated Apr. 15, 2019 in U.S. Appl. No. 16/182,083.
Office Action dated Apr. 16, 2019 in U.S. Appl. No. 16/232,165.
Office Action dated Apr. 23, 2019 in Japanese Application No. 2016-169851.
Office Action dated Apr. 23, 2019 in Japanese Application No. 2016-182230.
Office Action dated Aug. 23, 2019 in U.S. Appl. No. 15/854,409.
Office Action dated Aug. 25, 2017 in U.S. Appl. No. 14/838,663.

(56) References Cited

OTHER PUBLICATIONS

Office Action dated Aug. 27, 2019 in Japanese Application No. 2016-254428.
Office Action dated Aug. 27, 2019 in Japanese Application No. 2016-254430.
Office Action dated Aug. 27, 2019 in Japanese Application No. 2016-254432.
Office Action dated Aug. 28, 2019 in U.S. Appl. No. 15/854,397.
Office Action dated Aug. 6, 2019 in Japanese Application No. 2016-254421.
Office Action dated Aug. 6, 2019 in Japanese Application No. 2016-254427.
Office Action dated Dec. 19, 2018 in U.S. Appl. No. 15/900,345.
Office Action dated Dec. 19, 2018 in U.S. Appl. No. 15/900,379.
Office Action dated Dec. 20, 2018 in U.S. Appl. No. 15/900,106.
Office Action dated Dec. 20, 2018 in U.S. Appl. No. 15/900,242.
Office Action dated Dec. 21, 2018 in U.S. Appl. No. 15/900,160.
Office Action dated Dec. 21, 2018 in U.S. Appl. No. 15/920,616.
Office Action dated Dec. 25, 2018 in Japanese Application No. 2015-245144.
Office Action dated Dec. 25, 2018 in Japanese Application No. 2015-245145.
Office Action dated Dec. 25, 2018 in Japanese Application No. 2015-254192.
Office Action dated Dec. 27, 2018 in U.S. Appl. No. 15/900,334.
Office Action dated Dec. 31, 2018 in U.S. Appl. No. 16/009,603.
Office Action dated Dec. 7, 2018 in U.S. Appl. No. 15/920,592.
Office Action dated Feb. 11, 2016 in U.S. Appl. No. 14/838,663.
Office Action dated Feb. 21, 2019 in U.S. Appl. No. 15/854,383.
Office Action dated Feb. 26, 2019 in Japanese Application No. 2016-123207.
Office Action dated Feb. 26, 2019 in U.S. Appl. No. 15/380,336.
Office Action dated Feb. 26, 2019 in U.S. Appl. No. 15/624,792.
Office Action dated Feb. 26, 2019 in U.S. Appl. No. 15/624,897.
Office Action dated Feb. 26, 2019 in U.S. Appl. No. 15/626,832.
Office Action dated Feb. 28, 2019 in U.S. Appl. No. 15/920,518.
Office Action dated Feb. 5, 2019 in Japanese Application No. 2016-117339.
Office Action dated Feb. 5, 2019 in Japanese Application No. 2016-123205.
Office Action dated Feb. 5, 2019 in Japanese Application No. 2016-169871.
Office Action dated Feb. 5, 2019 in U.S. Appl. No. 16/038,339.
Office Action dated Feb. 7, 2019 in U.S. Appl. No. 15/621,464.
Office Action dated Jan. 10, 2019 in U.S. Appl. No. 15/899,430.
Office Action dated Jan. 29, 2019 in U.S. Appl. No. 15/614,876.
Office Action dated Jan. 30, 2019 in U.S. Appl. No. 15/620,916.
Office Action dated Jul. 16, 2019 in Japanese Application No. 2016-124933.
Office Action dated Jun. 10, 2019 in U.S. Appl. No. 15/920,518.
Office Action dated Jun. 25, 2019 in Japanese Application No. 2015-245144.
Office Action dated Jun. 6, 2019 in U.S. Appl. No. 15/899,587.
Office Action dated Mar. 15, 2018 in U.S. Appl. No. 14/838,663.
Office Action dated Mar. 15, 2019 in U.S. Appl. No. 15/280,195.
Office Action dated Mar. 15, 2019 in U.S. Appl. No. 15/619,012.
Office Action dated Mar. 15, 2019 in U.S. Appl. No. 15/627,696.
Office Action dated Mar. 15, 2019 in U.S. Appl. No. 15/690,906.
Office Action dated Mar. 18, 2019 in U.S. Appl. No. 15/442,961.
Office Action dated Mar. 19, 2019 in Japanese Application No. 2016-116261.
Office Action dated Mar. 19, 2019 in Japanese Application No. 2016-124515.
Office Action dated Mar. 19, 2019 in Japanese Application No. 2016-124529.
Office Action dated Mar. 19, 2019 in Japanese Application No. 2016-124932.
Office Action dated Mar. 19, 2019 in Japanese Application No. 2016-124933.
Office Action dated Mar. 19, 2019 in Japanese Application No. 2016-124935.
Office Action dated Mar. 19, 2019 in U.S. Appl. No. 15/443,094.
Office Action dated Mar. 21, 2019 in U.S. Appl. No. 15/900,144.
Office Action dated Mar. 21, 2019 in U.S. Appl. No. 16/160,377.
Office Action dated Mar. 27, 2019 in U.S. Appl. No. 15/690,400.
Office Action dated Mar. 30, 2017 in U.S. Appl. No. 14/838,663.
Office Action dated Mar. 5, 2019 in U.S. Appl. No. 15/443,026.
Office Action dated Mar. 5, 2019 in U.S. Appl. No. 15/854,397.
Office Action dated Mar. 6, 2019 in U.S. Appl. No. 15/854,403.
Office Action dated Mar. 7, 2019 in U.S. Appl. No. 15/854,439.
Office Action dated May 23, 2019 in U.S. Appl. No. 15/388,911.
Office Action dated Nov. 14, 2018 in U.S. Appl. No. 16/100,289.
Office Action dated Nov. 19, 2018 in U.S. Appl. No. 15/900,141.
Office Action dated Oct. 12, 2018 in U.S. Appl. No. 15/854,397.
Office Action dated Sep. 12, 2016 in U.S. Appl. No. 14/838,663.
Office Action dated Sep. 16, 2019 in U.S. Appl. No. 15/854,403.
Office Action dated Sep. 17, 2019 in Japanese Application No. 2017-029499.
Office Action dated Sep. 19, 2019 in U.S. Appl. No. 15/443,026.
Office Action dated Sep. 20, 2019 in U.S. Appl. No. 15/442,961.
Office Action dated Sep. 24, 2019 in Japanese Application No. 2016-254436.
Office Action dated Sep. 24, 2019 in Japanese Application No. 2016-254439.
Office Action dated Sep. 24, 2019 in Japanese Application No. 2016-254441.
Office Action dated Sep. 24, 2019 in Japanese Application No. 2016-254450.
Office Action dated Sep. 24, 2019 in Japanese Application No. 2017-029491.
Office Action dated Sep. 24, 2019 in Japanese Application No. 2017-029508.
Office Action dated Sep. 24, 2019 in Japanese Application No. 2017-065730.
Office Action dated Sep. 3, 2019 in Japanese Application No. 2016-254434.
Office Action dated Oct. 1, 2019 in Japanese Application No. 2017-029495.
Office Action dated Oct. 1, 2019 in Japanese Application No. 2017-029493.
Office Action dated Oct. 1, 2019 in Japanese Application No. 2017-029494.
Office Action dated Oct. 2, 2019 in U.S. Appl. No. 15/443,094.
Office Action dated Oct. 5, 2017 from the United States Patent and Trademark Office in U.S. Appl. No. 15/241,286.
Office Action dated Oct. 5, 2017 from the United States Patent and Trademark Office in U.S. Appl. No. 15/241,631.
Office Action dated Oct. 5, 2017 from the United States Patent and Trademark Office in U.S. Appl. No. 15/378,907.
Office Action dated Oct. 5, 2017 from the United States Patent and Trademark Office in U.S. Appl. No. 15/241,297.
Notice of Allowance dated Mar. 21, 2018 in U.S. Appl. No. 15/241,286.
Notice of Allowance dated Mar. 27, 2018 in U.S. Appl. No. 15/241,631.
Notice of Allowance dated Mar. 19, 2018 in U.S. Appl. No. 15/378,907.
Notice of Allowance dated Mar. 21, 2018 in U.S. Appl. No. 15/241,297.
Office Action dated Oct. 8, 2019 in Japanese Application No. 2017-029492.
Office Action dated Oct. 8, 2019 in Japanese Application No. 2017-065700.
Office Action dated Oct. 8, 2019 in Japanese Application No. 2017-065708.
Office Action dated Oct. 8, 2019 in Japanese Application No. 2017-065678.
Office Action dated Oct. 10, 2019 in U.S. Appl. No. 15/705,531.
Office Action dated Oct. 9, 2019 in U.S. Appl. No. 16/440,161.
Office Action dated Oct. 22, 2019 in U.S. Appl. No. 16/037,564.
Notice of Allowance dated Oct. 17, 2019 in U.S. Appl. No. 15/388,911.

(56) References Cited

OTHER PUBLICATIONS

Office Action dated Dec. 10, 2019 in Japanese Application No. 2016-254428.
Office Action dated Dec. 17, 2019 in Japanese Application No. 2016-254430.
Office Action dated Dec. 17, 2019 in Japanese Application No. 2016-254432.
Office Action dated Dec. 17, 2019 in Japanese Application No. 2017-029507.
Office Action dated Dec. 24, 2019 in Japanese Application No. 2016-254434.
Office Action dated Dec. 24, 2019 in Japanese Application No. 2017-029510.
Office Action dated Nov. 26, 2019 in Japanese Application No. 2016-254421.
Office Action dated Nov. 26, 2019 in Japanese Application No. 2017-029496.
Office Action dated Nov. 26, 2019 in Japanese Application No. 2017-029502.
Office Action dated Nov. 26, 2019 in Japanese Application No. 2017-065694.
Advisory Action dated Jan. 17, 2020 in U.S. Appl. No. 15/443,094.
Office Action dated Jan. 28, 2020 in U.S. Appl. No. 15/442,961.
Notice of Allowance dated Feb. 7, 2020 in U.S. Appl. No. 16/440,161.
Notice of Allowance dated Feb. 20, 2020 in U.S. Appl. No. 15/705,531.
Office Action dated Feb. 21, 2020 in U.S. Appl. No. 16/038,514.
Notice of Allowance dated Mar. 18, 2020 in U.S. Appl. No. 16/037,564.
Office Action dated Mar. 10, 2020 in U.S. Appl. No. 16/037,573.
Office Action dated Mar. 10, 2020 in U.S. Appl. No. 16/037,596.
Office Action dated Mar. 10, 2020 in U.S. Appl. No. 16/037,681.
Office Action dated Mar. 10, 2020 in U.S. Appl. No. 16/038,545.
Office Action dated Mar. 10, 2020 in U.S. Appl. No. 16/038,687.
Office Action dated Mar. 10, 2020 in U.S. Appl. No. 16/038,771.
Office Action dated Mar. 10, 2020 in U.S. Appl. No. 16/038,884.
Office Action dated Mar. 10, 2020 in U.S. Appl. No. 16/038,847.
Office Action dated Mar. 10, 2020 in U.S. Appl. No. 16/143,747.
Office Action dated Mar. 10, 2020 in U.S. Appl. No. 16/144,428.
Office Action dated Mar. 13, 2020 in U.S. Appl. No. 16/038,669.
Office Action dated Mar. 13, 2020 in U.S. Appl. No. 16/144,605.
Office Action dated Mar. 31, 2020 in U.S. Appl. No. 15/443,026.
Office Action dated Apr. 1, 2020 in U.S. Appl. No. 15/443,094.
Office Action dated Apr. 29, 2020 in U.S. Appl. No. 16/012,018.
Notice of Allowance dated May 7, 2020 in U.S. Appl. No. 16/038,514.
Notice of Allowance dated Aug. 17, 2020 in U.S. Appl. No. 15/443,026.
Notice of Allowance dated Aug. 3, 2020 in U.S. Appl. No. 16/038,884.
Notice of Allowance dated Jul. 23, 2020 in U.S. Appl. No. 16/037,573.
Notice of Allowance dated Jul. 23, 2020 in U.S. Appl. No. 16/038,669.
Notice of Allowance dated Jul. 24, 2020 in U.S. Appl. No. 16/037,596.
Notice of Allowance dated Jul. 27, 2020 in U.S. Appl. No. 16/038,771.
Notice of Allowance dated Jul. 29, 2020 in U.S. Appl. No. 16/037,681.
Notice of Allowance dated Jul. 29, 2020 in U.S. Appl. No. 16/144,428.
Notice of Allowance dated Jul. 29, 2020 in U.S. Appl. No. 16/144,605.
Notice of Allowance dated Jul. 30, 2020 in U.S. Appl. No. 16/038,545.
Notice of Allowance dated Jul. 30, 2020 in U.S. Appl. No. 16/038,687.
Notice of Allowance dated Sep. 17, 2020 in U.S. Appl. No. 16/012,018.
Notice of Allowance dated Sep. 23, 2020 in U.S. Appl. No. 15/443,094.
Office Action dated Jul. 8, 2020 in U.S. Appl. No. 15/442,961.
Notice of Allowance dated Aug. 3, 2020 in U.S. Appl. No. 16/038,847.

\* cited by examiner

MAGNETIC RECORDING MEDIUM HAVING CHARACTERIZED MAGNETIC LAYER AND MAGNETIC RECORDING AND REPRODUCING DEVICE

CROSS-REFERENCE TO RELATED APPLICATIONS

This application claims priority under 35 U.S.C 119 to Japanese Patent Application No. 2017-191665 filed on Sep. 29, 2017 and Japanese Patent Application No. 2018-170192 filed on Sep. 12, 2018. Each of the above applications is hereby expressly incorporated by reference, in its entirety, into the present application.

BACKGROUND OF THE INVENTION

1. Field of the Invention

The present invention relates to a magnetic recording medium and a magnetic recording and reproducing device.

2. Description of the Related Art

The recording and/or reproducing of information with respect to a magnetic recording medium is generally performed by bringing a surface of a magnetic recording medium (surface of magnetic layer) into contact with a magnetic head (hereinafter, also referred to as a "head") and sliding.

One performance required from the magnetic recording medium is to exhibit excellent electromagnetic conversion characteristics in a case of reproducing information recorded on the magnetic recording medium.

Meanwhile, in a case where chipping of a reproducing element of the head occurs due to the sliding between the surface of the magnetic layer and the head (hereinafter, also referred to as "head element chipping"), a distance between the surface of the magnetic layer and the reproducing element increases and spacing loss which is a reason of a deterioration of electromagnetic conversion characteristics may occur. As the countermeasure for preventing the occurrence of this spacing loss, a technology of providing a protective layer on the head has been proposed in the related art (for example, see JP2005-92967A).

SUMMARY OF THE INVENTION

However, data recorded on various recording media such as a magnetic recording medium is called hot data, warm data, and cold data depending on access frequencies (reproducing frequencies). The access frequencies decrease in the order of hot data, warm data, and cold data, and it is general that the cold data is stored as being recorded on a recording medium for a long period of time which is longer than 10 years (for example, several tens of years). The recording and storing of the cold data as described above is referred to as "archive". The data amount of the cold data recorded and stored on a magnetic recording medium increases in accordance with a dramatic increase in information contents and digitization of various information in recent years, and accordingly, a magnetic recording and reproducing system suitable for the archive is gaining attention.

In such a circumstance, a green tape test (GTT) is performed as a test for a magnetic recording and reproducing device (generally referred to as a "drive"). In the GTT, a particular use aspect for archive, in which cold data having a low access frequency is reproducing, is assumed, and a plurality of (for example, several hundreds of) new (unused) magnetic recording media are slid with respect to one head while changing the magnetic recording media. Meanwhile, in a head durability test in the related art, a use aspect with a high access frequency compared to the archive purpose has been assumed, and accordingly, one magnetic recording medium is normally repeatedly slid on the same magnetic head, without changing the magnetic recording medium to a new product. In such a durability test in the related art, a surface of a magnetic layer is worn while repeating the sliding, and thus, the head element chipping gradually becomes to hardly occur. With respect to this, in the GTT, the same head is repeatedly slid on a plurality of new magnetic recording media by changing the magnetic recording medium slid on the head to a new product, and thus, the head is in a severe condition where the chipping significantly easily occurs, compared to the durability test in the related art. In order to prevent such head element chipping in the GTT, the countermeasure on the head side and the countermeasure on the magnetic recording medium side have been considered. For example, as the countermeasure on the head side, an increase in thickness of a protective layer of the head has been considered, but an increase in thickness of the protective layer of the head causes an increase in distance between the surface of the magnetic layer and the reproducing element of the head, and this may cause spacing loss. With respect to this, in a case where the countermeasure on the magnetic recording medium side for preventing the head element chipping in the GTT can be found, a magnetic recording medium with such a countermeasure may be a magnetic recording medium suitable for a recording medium for archive, in which head element chipping hardly occurs in a use aspect for archive.

Therefore, an aspect of the invention provides for a magnetic recording medium suitable for a recording medium for archive capable of exhibiting excellent electromagnetic conversion characteristics, specifically, a magnetic recording medium capable of exhibiting excellent electromagnetic conversion characteristics and preventing occurrence of head element chipping in a green tape test (GTT).

According to an aspect of the invention, there is provided a magnetic recording medium comprising: a non-magnetic support; and a magnetic layer including a ferromagnetic powder and a binding agent, in which the ferromagnetic powder is a ferromagnetic hexagonal ferrite powder, the magnetic layer includes an oxide abrasive, an intensity ratio (Int(110)/Int(114); hereinafter, also referred to as "X-ray diffraction (XRD) intensity ratio) of a peak intensity Int(110) of a diffraction peak of a (110) plane with respect to a peak intensity Int(114) of a diffraction peak of a (114) plane of a hexagonal ferrite crystal structure obtained by an X-ray diffraction analysis of the magnetic layer by using an In-Plane method is 0.5 to 4.0, a vertical squareness ratio of the magnetic recording medium is 0.65 to 1.00, a coefficient of friction measured regarding a base portion of a surface of the magnetic layer is equal to or smaller than 0.30, and an average particle diameter of the oxide abrasive obtained from a secondary ion image obtained by irradiating the surface of the magnetic layer with a focused ion beam (FIB) (hereinafter, also referred to as a "FIB abrasive diameter") is 0.04 μm to 0.08 μm.

In one aspect, the vertical squareness ratio may be 0.65 to 0.90.

In one aspect, the coefficient of friction measured regarding the base portion of the surface of the magnetic layer is 0.15 to 0.30.

In one aspect, the oxide abrasive may be an alumina powder.

In one aspect, the magnetic recording medium may further comprise a non-magnetic layer including a non-magnetic powder and a binding agent between the non-magnetic support and the magnetic layer.

In one aspect, the magnetic recording medium may further comprise a back coating layer including a non-magnetic powder and a binding agent on a surface of the non-magnetic support opposite to a surface provided with the magnetic layer.

In one aspect, the magnetic recording medium may be a magnetic tape.

According to another aspect of the invention, there is provided a magnetic recording and reproducing device comprising: the magnetic recording medium; and a magnetic head.

In one aspect, the magnetic head may be a magnetic head including magnetoresistive (MR) element.

According to one aspect of the invention, it is possible to provide a magnetic recording medium suitable for archive use, which is capable of exhibiting excellent electromagnetic conversion characteristics and preventing occurrence of head element chipping in a green tape test (GTT), and a magnetic recording and reproducing device including this magnetic recording medium.

DESCRIPTION OF THE PREFERRED EMBODIMENTS

Magnetic Recording Medium

One aspect of the invention relates to a magnetic recording medium including: a non-magnetic support; and a magnetic layer including a ferromagnetic powder and a binding agent, in which the ferromagnetic powder is a ferromagnetic hexagonal ferrite powder, the magnetic layer includes an oxide abrasive, an intensity ratio (Int(110)/Int(114)) of a peak intensity Int(110) of a diffraction peak of a (110) plane with respect to a peak intensity Int(114) of a diffraction peak of a (114) plane of a hexagonal ferrite crystal structure obtained by an X-ray diffraction analysis of the magnetic layer by using an In-Plane method is 0.5 to 4.0, a vertical squareness ratio of the magnetic recording medium is 0.65 to 1.00, a coefficient of friction measured regarding a base portion of a surface of the magnetic layer is equal to or smaller than 0.30, and an average particle diameter of the oxide abrasive obtained from a secondary ion image obtained by irradiating the surface of the magnetic layer with a focused ion beam (FIB abrasive diameter) is 0.04 µm to 0.08 µm.

In the invention and the specification, the "surface of the magnetic layer" is identical to the surface of the magnetic recording medium on the magnetic layer side. In the invention and the specification, the "ferromagnetic hexagonal ferrite powder" means an aggregate of a plurality of ferromagnetic hexagonal ferrite particles. The ferromagnetic hexagonal ferrite particles are ferromagnetic particles having a hexagonal ferrite crystal structure. Hereinafter, particles (ferromagnetic hexagonal ferrite particles) configuring the ferromagnetic hexagonal ferrite powder are also referred to as "hexagonal ferrite particles" or simply "particles". The "aggregate" not only includes an aspect in which particles configuring the aggregate are directly in contact with each other, but also includes an aspect in which a binding agent or an additive is interposed between the particles. The points described above are also applied to various powders such as non-magnetic powder of the invention and the specification, in the same manner.

In the invention and the specification, the "oxide abrasive" means a non-magnetic oxide powder having Mohs hardness exceeding 8.

In the invention and the specification, the description regarding directions and angles (for example, vertical, orthogonal, parallel, and the like) includes a range of errors allowed in the technical field of the invention, unless otherwise noted. For example, the range of errors means a range of less than ±10° from an exact angle, and is preferably within ±5° and more preferably within ±3° from an exact angle.

A surmise of the inventors regarding the magnetic recording medium is as follows.

The inventors have thought that the vertical squareness ratio of the magnetic recording medium and the XRD intensity ratio set to be in the ranges described above mainly contribute to the magnetic recording medium to exhibit excellent electromagnetic conversion characteristics, specifically to reproduce information recorded on the magnetic recording medium at a high signal-to-noise-ratio (SNR). This point will be further described hereinafter.

The magnetic recording medium includes the ferromagnetic hexagonal ferrite powder in the magnetic layer. The inventors have surmised that the ferromagnetic hexagonal ferrite powder included in the magnetic layer includes particles which affect magnetic properties of the ferromagnetic hexagonal ferrite powder (aggregate of particles) (hereinafter, also referred to as "former particles") and particles which are considered not to affect or slightly affects the magnetic properties thereof (hereinafter, also referred to as "latter particles"). It is considered that the latter particles are, for example, fine particles generated due to partial chipping of particles due to a dispersion process performed at the time of preparing a magnetic layer forming composition.

The inventors have thought that, in the particles included in the ferromagnetic hexagonal ferrite powder included in the magnetic layer, the former particles are particles causing the diffraction peak in the X-ray diffraction analysis using the In-Plane method, and since the latter particles are fine, the latter particles do not cause the diffraction peak or hardly affect the diffraction peak. Accordingly, it is surmised that it is possible to control a presence state of the particles affecting the magnetic properties of the ferromagnetic hexagonal ferrite powder present in the magnetic layer, based on the intensity of the diffraction peak caused by the X-ray diffraction analysis of the magnetic layer using the In-Plane method. The inventors have surmised that the XRD intensity ratio which will be described later in detail is an index regarding this point.

Meanwhile, the vertical squareness ratio is a ratio of residual magnetization with respect to saturation magnetization measured in a direction vertical to the surface of the magnetic layer and this value decreases, as a value of the residual magnetization decreases. It is surmised that, since the latter particles are fine and hardly hold magnetization, as a large amount of the latter particles is included in the magnetic layer, the vertical squareness ratio tends to decrease. Accordingly, the inventors have thought that the vertical squareness ratio may be an index for the amount of the latter particles (fine particles) present in the magnetic layer. In addition, the inventors have thought that, as the amount of such fine particles present in the magnetic layer is small, the magnetic properties of the ferromagnetic hexagonal ferrite powder are improved.

In addition, the inventors have surmised that it is possible to improve electromagnetic conversion characteristics, by setting the vertical squareness ratio of the magnetic recording medium and the XRD intensity ratio to be in the ranges described above, by decreasing the amount of latter particles (fine particles) present in the magnetic layer and controlling the state of the former particles present in the magnetic layer.

Further, the inventors have thought that, the coefficient of friction measured regarding the base portion of the surface of the magnetic layer and the FIB abrasive diameter in the magnetic recording medium set to be in the respective ranges described above mainly contribute to prevention of occurrence of the head element chipping in the GTT. This point will be further described hereinafter.

The "base portion" of the invention and the specification is a portion of the surface of the magnetic layer of the magnetic recording medium specified by the following method.

A surface on which volume of a protruded component and volume of a recess component in a visual field measured by an atomic force microscope (AFM) are identical to each other is determined as a reference surface. A projection having a height equal to or greater than 15 nm from the reference surface is defined as a projection. A portion in which the number of such projections is zero, that is, a portion of the surface of the magnetic layer of the magnetic recording medium in which a projection having a height equal to or greater than 15 nm from the reference surface is not detected is specified as the base portion.

A coefficient of friction measured regarding the base portion is a value measured by the following method.

In the base portion (measured part: length of a magnetic tape in a longitudinal direction of 10 μm or length of a magnetic disk in a radius direction of 10 μm), a diamond spherical indenter having a radius of 1 μm is allowed to reciprocate once with a load of 100 μN and a speed of 1 μm/sec to measure a frictional force (horizontal force) and a normal force. The frictional force and the normal force measured here are an arithmetical mean of respective values obtained by continuously measuring frictional forces and normal forces during the one reciprocating operation. The measurement described above can be performed with TI-950 type TRIBOINDENTER manufactured by Hysitron, Inc. A value of a coefficient of friction $\mu$ is calculated from an arithmetical mean of the frictional forces and an arithmetical mean of the normal forces measured as described above. The coefficient of friction is a value measured by an equation of $F=\mu N$, from the frictional force (horizontal force) F (unit: newton (N)) and the normal force N (unit: newton (N)). The measurement and the calculation of the value of the coefficient of friction $\mu$ are performed at three portions of the base portion randomly selected from the surface of the magnetic layer of the magnetic recording medium, and an arithmetical mean of the three measured values obtained is set as a coefficient of friction measured regarding the base portion. Hereinafter, the coefficient of friction measured regarding the base portion is also referred to as a "base friction".

In recent years, a technology of including a non-magnetic powder such as an oxide abrasive in the magnetic layer of the magnetic recording medium is widely performed. Such a non-magnetic powder is generally protruded from the surface of the magnetic layer and to form projections, and thereby exhibiting various functions. In general, the coefficient of friction measured regarding the magnetic recording medium is a coefficient of friction measured in a region including such projections. With respect to this, the base friction is measured in a portion of the surface of the magnetic layer of the magnetic recording medium in which a projection having a height equal to or greater than 15 nm from the reference surface is not detected, that is, the base portion, as described above. It is considered that this base portion has a low frequency of a contact with the head in a case where the surface of the magnetic layer and the head slide on each other. However, it is thought that, a high coefficient of friction of the base portion which is in contact with the head, even in a case of a low frequency, disturbs smooth sliding between the base portion and the head. It is thought that unsmooth sliding between the base portion and head may cause chipping of the head element due to the sliding with the surface of the magnetic layer in GTT. With respect to this, it is surmised that, the base friction in the magnetic recording medium equal to or smaller than 0.30 contributes to the smooth sliding between the base portion and the head, thereby contributing to prevention of the occurrence of the head element chipping in GTT.

In the invention and the specification, the FIB abrasive diameter is a value obtained by the following method.

(1) Obtaining Secondary Ion Image

A secondary ion image of a region, having a size of 25 μm×25 μm, of the surface of the magnetic layer of the magnetic recording medium which is a target for obtaining the FIB abrasive diameter is obtained by a focused ion beam device. As the focused ion beam device, MI4050 manufactured by Hitachi High-Technologies Corporation can be used.

Beam irradiation conditions of the focused ion beam device in a case of obtaining the secondary ion image are set so that an acceleration voltage is 30 kV, a current value is 133 pA (picoampere), a beam size is 30 nm, and a brightness is 50%. A coating process with respect to a surface of a magnetic layer before the imaging is not performed. A secondary ion (SI) signal is detected by a secondary ion detector and a secondary ion image is captured. Conditions for capturing a secondary ion image are determined by the following method. ACB (auto contrast brightness) is carried out at three spots on a non-imaged region of the surface of the magnetic layer (i.e., ACB is carried out three times) to stabilize a color of the image. Then, the contrast reference value and the brightness reference value are determined. The brightness reference value as determined in the above ACB and the contrast value which is lowered by 1% from the contrast reference value as determined in the above ACB are determined as the conditions for capturing a secondary ion image. A non-imaged region of the surface of the magnetic layer is selected, and a secondary ion image is captured under the conditions for capturing as determined above. A portion for displaying a size and the like (micron bar, cross mark, and the like) is removed from the captured image, and a secondary ion image having the pixel number of 2,000 pixel×2,000 pixel is obtained. For specific examples of the imaging conditions, examples which will be described later can be referred to.

(2) Calculation of FIB Abrasive Diameter

The secondary ion image obtained in (1) is put into image processing software, and a binarization process is performed by the following procedure. As the image analysis software, ImageJ which is free software can be used, for example.

A tone of the secondary ion image obtained in (1) is changed to 8 bit. Regarding threshold values for the binarization process, a lower limit value is set as 250 gradations, an upper limit value is set as 255 gradations, and the binarization process is executed by these two threshold values. After the binarization process, a noise component removal process is performed by the image analysis software. The noise component removal process can be carried out, for example, by the following method. On the image analysis software, ImageJ, a noise cut process Despeckle is selected, and Size 4.0-Infinity is set on AnalyzeParticle to remove noise components.

Each white-shining portion in the binarization process image obtained as described above is determined as an oxide abrasive, and the number of white-shining portions is obtained by the image analysis software, and the area of the white-shining portion is obtained. An equivalent circle diameter of each portion is obtained from the area of the white-shining portion obtained here. Specifically, an equivalent circle diameter L is calculated from the obtained area A by $(A/\pi)^{(1/2)} \times 2 = L$.

The above step is performed four times at different portions (25 μm×25 μm) of the surface of the magnetic layer of the magnetic recording medium which is a target for obtaining the FIB abrasive diameter, and the FIB abrasive diameter is calculated from the obtained results by an expression; FIB abrasive diameter=$\Sigma(Li)/\Sigma i$. $\Sigma i$ is a total number of the white-shining portions observed in the binarization process image obtained by performing the above step four times. $\Sigma(Li)$ is a total of the equivalent circle diameters L obtained regarding the white-shining portions observed in the binarization process image obtained by performing the above step four times. Regarding the white-shining portion, only a part of the portion may be included in the binarization process image. In such a case, $\Sigma i$ and $\Sigma(Li)$ are obtained without including the part.

The FIB abrasive diameter is a value which can be an index of a presence state of an oxide abrasive in the magnetic layer, and is obtained from the secondary ion image obtained by irradiating the surface of the magnetic layer with a focused ion beam (FIB). This secondary ion image is generated by capturing secondary ion generated from the surface of the magnetic layer irradiated with the FIB. Meanwhile, as an observation method of the presence state of the abrasive in the magnetic layer, a method using a scanning electron microscope (SEM) has been proposed in the related art. By the SEM, the surface of the magnetic layer is irradiated with an electron beam and secondary electrons emitted from the surface of the magnetic layer are captured to generate an image (SEM image). Even in a case where the same magnetic layer is observed, a size of the oxide abrasive obtained from the secondary ion image and a size of the oxide abrasive obtained from the SEM image are different from each other due to a difference of such image generation principle. As a result of intensive studies of the inventors, a presence state of the oxide abrasive in the magnetic layer is controlled so that the FIB abrasive diameter becomes 0.04 μm to 0.08 μm, by setting the FIB abrasive diameter obtained from the secondary ion image by the method described above as a new index of the presence state of the oxide abrasive in the magnetic layer. The inventors have thought that the controlling of the presence state of the oxide abrasive in the magnetic layer as described above also contributes to prevention of chipping of the head element due to the sliding on the surface of the magnetic layer in the GTT.

The inventors have surmised that, as described above, excellent electromagnetic conversion characteristics exhibited by the magnetic recording medium mainly contributes to the setting of the XRD intensity ratio and the vertical squareness ratio to be in the ranges described above, and the prevention of the occurrence of the head element chipping in the GTT mainly contributes to the setting of the base friction and the FIB abrasive diameter to be in the ranges described above. However, the invention is not limited to the surmise described above.

Hereinafter, the magnetic recording medium will be further described in detail.

XRD Intensity Ratio

The magnetic recording medium includes ferromagnetic hexagonal ferrite powder in the magnetic layer. The XRD intensity ratio is obtained by the X-ray diffraction analysis of the magnetic layer including the ferromagnetic hexagonal ferrite powder by using the In-Plane method. Hereinafter, the X-ray diffraction analysis performed by using the In-Plane method is also referred to as "In-Plane XRD". The In-Plane XRD is performed by irradiating the surface of the magnetic layer with the X-ray by using a thin film X-ray diffraction device under the following conditions. The magnetic recording medium is widely divided into a tape-shaped magnetic recording medium (magnetic tape) and a disk-shaped magnetic recording medium (magnetic disk). A measurement direction is a longitudinal direction of the magnetic tape and a radius direction of the magnetic disk.

Cu ray source used (output of 45 kV, 200 mA)

Scan conditions: 0.05 degree/step, 0.1 degree/min in a range of 20 to 40 degrees Optical system used: parallel optical system Measurement method: $2\theta_\chi$ scan (X-ray incidence angle of 0.25°)

The values of the conditions are set values of the thin film X-ray diffraction device. As the thin film X-ray diffraction device, a well-known device can be used. As an example of the thin film X-ray diffraction device, Smart Lab manufactured by Rigaku Corporation. A sample to be subjected to the In-Plane XRD analysis is a medium sample cut out from the magnetic recording medium which is a measurement target, and the size and the shape thereof are not limited, as long as the diffraction peak which will be described later can be confirmed.

As a method of the X-ray diffraction analysis, thin film X-ray diffraction and powder X-ray diffraction are used. In the powder X-ray diffraction, the X-ray diffraction of the powder sample is measured, whereas, according to the thin film X-ray diffraction, the X-ray diffraction of a layer or the like formed on a substrate can be measured. The thin film X-ray diffraction is classified into the In-Plane method and an Out-Of-Plane method. The X-ray incidence angle at the time of the measurement is 5.00° to 90.00° in a case of the Out-Of-Plane method, and is generally 0.20° to 0.50°, in a case of the In-Plane method. In the In-Plane XRD of the invention and the specification, the X-ray incidence angle is 0.25° as described above. In the In-Plane method, the X-ray incidence angle is smaller than that in the Out-Of-Plane method, and thus, a depth of penetration of the X-ray is shallow. Accordingly, according to the X-ray diffraction analysis by using the In-Plane method (In-Plane XRD), it is possible to perform the X-ray diffraction analysis of a surface portion of a measurement target sample. Regarding the magnetic recording medium sample, according to the In-Plane XRD, it is possible to perform the X-ray diffraction analysis of the magnetic layer. The XRD intensity ratio is an intensity ratio (Int(110)/Int(114)) of a peak intensity Int(110) of a diffraction peak of a (110) plane with respect to a peak intensity Int(114) of a diffraction peak of a (114) plane of a hexagonal ferrite crystal structure, in X-ray diffraction spectra obtained by the In-Plane XRD. The term Int is used as abbreviation of intensity. In the X-ray diffraction spectra obtained by In-Plane XRD (vertical axis: intensity, horizontal axis: diffraction angle $2\theta_\chi$ (degree)), the diffraction peak of the (114) plane is a peak at which the $2\theta_\chi$ is detected at 33 to 36 degrees, and the diffraction peak of the (110) plane is a peak at which the $2\theta_\chi$ is detected at 29 to 32 degrees.

Among the diffraction plane, the (114) plane having a hexagonal ferrite crystal structure is positioned close to particles of the ferromagnetic hexagonal ferrite powder (hexagonal ferrite particles) in an easy-magnetization axial direction (c axis direction). In addition the (110) plane having a hexagonal ferrite crystal structure is positioned in a direction orthogonal to the easy-magnetization axial direction.

The inventors have surmised that, in the X-ray diffraction spectra obtained by the In-Plane XRD, as the intensity ratio (Int(110)/Int(114); XRD intensity ratio) of the peak intensity Int(110) of the diffraction peak of a (110) plane with respect to the peak intensity Int(114) of the diffraction peak of the (114) plane of a hexagonal ferrite crystal structure increases, a large number of the former particles present in a state where a direction orthogonal to the easy-magnetization axial direction is closer to a parallel state with respect to the surface of the magnetic layer is present in the magnetic layer, and as the XRD intensity ratio decreases, a small amount of the former particles present in such a state is present in the magnetic layer. It is thought that a state where the XRD intensity ratio is 0.5 to 4.0 means a state where the former particles are suitably aligned in the magnetic layer. The inventors have surmised that this contributes to the improvement of electromagnetic conversion characteristics.

The XRD intensity ratio is preferably equal to or smaller than 3.5 and more preferably equal to or smaller than 3.0, from a viewpoint of further improving electromagnetic conversion characteristics. From the same viewpoint, the XRD intensity ratio is preferably equal to or greater than 0.7 and more preferably equal to or greater than 1.0. The XRD intensity ratio can be, for example, controlled in accordance with process conditions of an alignment process performed in a manufacturing step of the magnetic recording medium. As the alignment process, the homeotropic alignment process is preferably performed. The homeotropic alignment process can be preferably performed by applying a magnetic field vertically to the surface of a coating layer of a magnetic layer forming composition in a wet state (undried state). As the alignment conditions are reinforced, the value of the XRD intensity ratio tends to increase. As the process conditions of the alignment process, magnetic field strength of the alignment process is used. The process conditions of the alignment process are not particularly limited. The process conditions of the alignment process may be set so as that the XRD intensity ratio of 0.5 to 4.0 can be realized. As an example, the magnetic field strength of the homeotropic alignment process can be 0.10 to 0.80 T or 0.10 to 0.60 T. As dispersibility of the ferromagnetic hexagonal ferrite powder in the magnetic layer forming composition increases, the value of the XRD intensity ratio tends to increase by the homeotropic alignment process.

Vertical Squareness Ratio

The vertical squareness ratio is a squareness ratio measured regarding a magnetic recording medium in a vertical direction. The "vertical direction" described regarding the squareness ratio is a direction orthogonal to the surface of the magnetic layer. For example, in a case where the magnetic recording medium is a tape-shaped magnetic recording medium, that is, a magnetic tape, the vertical direction is a direction orthogonal to a longitudinal direction of the magnetic tape. The vertical squareness ratio is measured by using a vibrating sample magnetometer. Specifically, the vertical squareness ratio of the invention and the specification is a value obtained by sweeping an external magnetic field in the magnetic recording medium at a measurement temperature of 23° C.±1° C. in the vibrating sample magnetometer, under conditions of a maximum external magnetic field of 1194 kA/m (15 kOe) and a scan speed of 4.8 kA/m/sec (60 Oe/sec), and is a value after diamagnetic field correction. The measurement value is obtained as a value obtained by subtracting magnetization of a sample probe of the vibrating sample magnetometer as background noise.

The vertical squareness ratio of the magnetic recording medium is equal to or greater than 0.65. The inventors have surmised that the vertical squareness ratio of the magnetic recording medium is an index for the presence amount of the latter particles (fine particles) described above. It is thought that, in the magnetic layer in which the vertical squareness ratio of the magnetic recording medium is equal to or greater than 0.65, the presence amount of such fine particles is small. The inventors have surmised that this contributes to the improvement of electromagnetic conversion characteristics. From a viewpoint of further improving electromagnetic conversion characteristics, the vertical squareness ratio is preferably equal to or greater than 0.70, more preferably equal to or greater than 0.73, and even more preferably equal to or greater than 0.75. In addition, in principle, a maximum value of the squareness ratio is 1.00. Accordingly, the vertical squareness ratio of the magnetic tape is equal to or smaller than 1.00. The vertical squareness ratio may be, for example, equal to or smaller than 0.95, equal to or smaller than 0.90, equal to or smaller than 0.87, or equal to or smaller than 0.85. However, it is thought that, a great value of the vertical squareness ratio is preferable, from a viewpoint of decreasing the amount of the fine latter particles in the magnetic layer and improving electromagnetic conversion characteristics. Therefore, the vertical squareness ratio may be greater than the value exemplified above.

The inventors have considered that, in order to set the vertical squareness ratio to be equal to or greater than 0.65, it is preferable to prevent occurrence of fine particles due to partial chipping of the particles in a preparation step of the magnetic layer forming composition. Specific means for preventing the occurrence of chipping will be described later.

Base Friction

The coefficient of friction (base friction) measured regarding the base portion of the surface of the magnetic layer of the magnetic recording medium is equal to or smaller than 0.30, is preferably equal to or smaller than 0.28 and more preferably equal to or smaller than 0.26, from a viewpoint of further preventing the occurrence of the head element chipping in GTT. The base friction can be, for example, equal to or greater than 0.10, equal to or greater than 0.15, or equal to or greater than 0.20. However, from a viewpoint of preventing the occurrence of the head element chipping in GTT, a low base friction is preferable, and thus, the base friction may be smaller than the values described above.

In the measurement method of the base friction described above, the reason why a projection having a height equal to or greater than 15 nm from the reference surface is defined as a projection is because, normally, a projection recognized as a projection present on the surface of the magnetic layer is mainly a projection having a height equal to or greater than 15 nm from the reference surface. Such a projection is, for example, formed of non-magnetic powder such as an oxide abrasive on the surface of the magnetic layer. With respect to this, it is considered that more microscopic ruggedness than ruggedness formed by such a projection is present on the surface of the magnetic layer. It is surmised that it is possible to adjust the base friction by controlling a shape of the microscopic ruggedness. As a method for realizing the adjustment described above, a method of using two or more kinds of ferromagnetic hexagonal ferrite powders having different average particle sizes as the ferromagnetic hexagonal ferrite powder is used. More specifically, it is thought that, the microscopic ruggedness can be formed on the base portion, in a case where the ferromagnetic hexagonal ferrite powder having a greater average particle size becomes a protruded component, and it is possible to increase a percentage of the protruded component present on the base portion by increasing a mixing percentage of the ferromagnetic hexagonal ferrite powder having a greater average particle size (or, conversely, to decrease a percentage of protruded component present on the base portion by decreasing the mixing percentage). Such a method will be described later more specifically.

As another method, a method of forming a magnetic layer with other non-magnetic powder having a greater average particle size than that of ferromagnetic hexagonal ferrite powder, in addition to non-magnetic powder such as an oxide abrasive which can form a projection having a height equal to or greater than 15 nm from the reference surface on the surface of the magnetic layer. More specifically, it is thought that, the microscopic ruggedness can be formed on the base portion, in a case where the other non-magnetic powder becomes a protruded component, and it is possible to increase a percentage of the protruded component present on the base portion by increasing a mixing percentage of the non-magnetic powder (or, conversely, to decrease a percentage of protruded component present on the base portion by decreasing the mixing percentage). Such a method will be described later more specifically.

In addition, it is also possible to adjust the base friction by combining the two kinds of methods.

However, the adjustment methods are merely examples, and it is possible to realize a base friction equal to or smaller than 0.30 by any method capable of adjusting the base friction, and such an aspect is also included in the invention.

FIB Abrasive Diameter

The FIB abrasive diameter obtained from the secondary ion image obtained by irradiating the surface of the magnetic layer of the magnetic recording medium with the FIB is 0.04 µm to 0.08 µm. It is thought that the FIB abrasive diameter set to be equal to or smaller than 0.08 contributes to the prevention of the chipping of the head element due to the oxide abrasive in the GTT. In addition, it is surmised that the FIB abrasive diameter set to be equal to or greater than 0.04 µm contributes to the removal of a component derived from the magnetic layer attached to the head due to the sliding with the surface of the magnetic layer in the GTT. It is thought that this contributes to prevention of the chipping of the element of the head due to the sliding between the surface of the magnetic layer and the head, in a state where the component derived from the magnetic layer is attached to the head in the GTT. From a viewpoint of further preventing the occurrence of the head element chipping in the GTT, the FIB abrasive diameter is preferably equal to or greater than 0.05 µm and more preferably equal to or greater than 0.06 µm. In addition, from the same viewpoint, the FIB abrasive diameter is preferably equal to or smaller than 0.07 µm. A specific aspect of means for adjusting the FIB abrasive diameter will be described later.

Hereinafter, the magnetic recording medium will be described more specifically.

Magnetic Layer

Ferromagnetic Hexagonal Ferrite Powder

The magnetic layer of the magnetic recording medium includes ferromagnetic hexagonal ferrite powder as ferromagnetic powder. Regarding the ferromagnetic hexagonal ferrite powder, a magnetoplumbite type (also referred to as an "M type"), a W type, a Y type, and a Z type are known as the crystal structure of the hexagonal ferrite. The ferromagnetic hexagonal ferrite powder included in the magnetic layer may have any crystal structure. In addition, an iron atom and a divalent metal atom are included in the crystal structure of the hexagonal ferrite, as constituent atoms. The divalent metal atom is a metal atom which may become divalent cations as ions, and examples thereof include a barium atom, a strontium atom, an alkali earth metal atom such as calcium atom, and a lead atom. For example, the hexagonal ferrite including a barium atom as the divalent metal atom is a barium ferrite, and the hexagonal ferrite including a strontium atom is a strontium ferrite. In addition, the hexagonal ferrite may be a mixed crystal of two or more hexagonal ferrites. As an example of the mixed crystal, a mixed crystal of the barium ferrite and the strontium ferrite can be used.

As described above, as a method of adjusting the base friction, a method of forming a magnetic layer with two or more kinds of ferromagnetic hexagonal ferrite powders having different average particle sizes as ferromagnetic hexagonal ferrite powder is used. In this case, it is preferable that the ferromagnetic powder having a smaller average particle size is used as ferromagnetic hexagonal ferrite powder used with the largest proportion, among the two or more kinds of ferromagnetic hexagonal ferrite powder, from a viewpoint of improving recording density of the magnetic recording medium. From this viewpoint, in a case where two or more kinds of ferromagnetic hexagonal ferrite powders having different average particle sizes are included in the magnetic layer, it is preferable that the ferromagnetic hexagonal ferrite powder having an average particle size equal to or smaller than 50 nm is preferably used as the ferromagnetic hexagonal ferrite powder with the largest proportion based on mass. On the other hand, it is preferable that an average particle size of the ferromagnetic hexagonal ferrite powder with the largest proportion is equal to or greater than 10 nm, from a viewpoint of stability of magnetization. In a case of using one kind of ferromagnetic hexagonal ferrite powder without using two or more kinds of ferromagnetic hexagonal ferrite powders having different average particle sizes, the average particle size of the ferromagnetic hexagonal ferrite powder is preferably 10 nm to 50 nm, due to the reasons described above.

With respect to this, it is preferable that the ferromagnetic hexagonal ferrite powder used with the ferromagnetic hexagonal ferrite powder with the largest proportion preferably has a greater average particle size than that of the ferromagnetic hexagonal ferrite powder with the largest proportion. This may be because the base friction can be decreased due to the protruded component formed of the ferromagnetic hexagonal ferrite powder having a great average particle size on the base portion. From this viewpoint, a difference between an average particle size of the ferromagnetic hexagonal ferrite powder with the largest proportion and an average particle size of the ferromagnetic hexagonal ferrite powder used therewith, acquired as "(latter average particle size)–(former average particle size)" is preferably 10 to 80 nm, more preferably 10 to 50 nm, and even more preferably 10 to 40 nm. As the ferromagnetic hexagonal ferrite powder used with the ferromagnetic hexagonal ferrite powder with the largest proportion, it is also possible to use two or more kinds of ferromagnetic hexagonal ferrite powders having different average particle sizes. In this case, it is preferable that an average particle size of at least one of ferromagnetic hexagonal ferrite powder of the two or more kinds of ferromagnetic hexagonal ferrite powders satisfies the difference described above, it is more preferable that average particle sizes of more kinds of ferromagnetic hexagonal ferrite powders satisfy the difference described above, and it is even more preferable that average particle sizes of all of the ferromagnetic hexagonal ferrite powders satisfy the difference described above, with respect to the average particle size of the ferromagnetic hexagonal ferrite powder used with the largest proportion.

Regarding two or more kinds of ferromagnetic hexagonal ferrite powders having different average particle sizes, from a viewpoint of controlling base friction, a mixing ratio of the ferromagnetic hexagonal ferrite powder with the largest proportion to the other ferromagnetic powder (in a case of using two or more kinds of ferromagnetic hexagonal ferrite powders having different average particle sizes as other ferromagnetic hexagonal ferrite powder, the total thereof), is preferably 90.0:10.0 (former:latter) to 99.9:0.1 and more preferably 95.0:5.0 to 99.5:0.5 based on mass.

Here, the ferromagnetic hexagonal ferrite powders having different average particle sizes indicate the total or a part of a batch of the ferromagnetic hexagonal ferrite powders having different average particle sizes. In a case where particle size distribution based on the number or volume of the ferromagnetic hexagonal ferrite powder included in the magnetic layer of the magnetic recording medium formed with the ferromagnetic hexagonal ferrite powders having different average particle sizes as described above is measured by a well-known measurement method such as a dynamic light scattering method or a laser diffraction method, an average particle size or a maximum peak in the vicinity thereof of the ferromagnetic hexagonal ferrite powder used with the largest proportion can be normally confirmed in a particle size distribution curve obtained by the measurement. In addition, an average particle size or a peak in the vicinity thereof of each ferromagnetic hexagonal ferrite powder may be confirmed. Accordingly, in a case where the particle size distribution of the ferromagnetic hexagonal ferrite powder included in the magnetic layer of the magnetic recording medium formed by using ferromagnetic hexagonal ferrite powder having an average particle size of 10 to 50 nm with the largest proportion, for example, is measured, the maximum peak can be generally confirmed in a range of the particle size of 10 to 50 nm in the particle size distribution curve.

A part of the other ferromagnetic hexagonal ferrite powders described above may be substituted with other non-magnetic powder which will be described later.

In the invention and the specification, average particle sizes of various powder such as the ferromagnetic hexagonal ferrite powder and the like are values measured by the following method with a transmission electron microscope, unless otherwise noted.

The powder is imaged at a magnification ratio of 100,000 with a transmission electron microscope, the image is printed on printing paper so that the total magnification of 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly extracted. An arithmetical mean of the particle size of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss.

In the invention and the specification, the average particle size of the ferromagnetic hexagonal ferrite powder and other powder is an average particle size obtained by the method described above, unless otherwise noted. The average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted.

As a method of collecting a sample powder from the magnetic tape in order to measure the particle size, a method disclosed in a paragraph of 0015 of JP2011-048878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (article size) of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetical mean of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, and in a case of the definition (2), the average particle size is an average plate diameter. In a case of the definition (3), the average particle size is an average diameter (also referred to as an average particle diameter).

The shape of the particle configuring the ferromagnetic hexagonal ferrite powder is obtained by tracing an outline of the particle (primary particle) with a digitizer in the image of the particle obtained by using the transmission electron microscope as described above. Regarding the shape of the particle configuring the ferromagnetic hexagonal ferrite powder, a "planar shape" is a shape having two plate surfaces facing each other. Meanwhile, among the shapes of the particles not having such a plate surface, a shape having distinguished long axis and short axis is an "elliptical shape". The long axis is determined as an axis (linear line) having the longest length of the particle. In contrast, the short axis is determined as an axis having the longest length of the particle in a linear line orthogonal to the long axis. A shape not having distinguished long axis and short axis, that is, a shape in which the length of the long axis is the same as the length of the short axis is a "sphere shape". From the shapes, a shape in which the long axis and the short axis are hardly specified, is called an undefined shape. The imaging with a transmission electron microscope for specifying the shapes of the particles is performed without performing the alignment process with respect to the imaging target powder. The shape of the raw material powder used for the preparation of the magnetic layer forming composition and the ferromagnetic hexagonal ferrite powder included in the magnetic layer may be any one of the planar shape, the elliptical shape, the sphere shape, and the undefined shape.

For details of the ferromagnetic hexagonal ferrite powder, descriptions disclosed in paragraphs 0134 to 0136 of JP2011-216149A can be referred to, for example.

The content (filling percentage) of the ferromagnetic hexagonal ferrite powder of the magnetic layer is preferably 50% to 90% by mass and more preferably 60% to 90% by mass. The components other than the ferromagnetic hexagonal ferrite powder of the magnetic layer are at least a binding agent and an oxide abrasive, and one or more kinds of additives can be randomly included. A high filling percentage of the ferromagnetic hexagonal ferrite powder of the magnetic layer is preferable, from a viewpoint of improving recording density.

Binding Agent and Curing Agent

The magnetic recording medium includes a binding agent in the magnetic layer. The binding agent is one or more kinds of resin. The resin may be a homopolymer or a copolymer. As the binding agent included in the magnetic layer, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins can be used as the binding agent even in the non-magnetic layer and/or a back coating layer which will be described later. For the binding agent described above, description disclosed in paragraphs 0029 to 0031 of JP2010-24113A can be referred to. An average molecular weight of the resin used as the binding agent can be, for example, 10,000 to 200,000 as a weight-average molecular weight. The weight-average molecular weight in the invention and the specification is a value obtained by performing polystyrene conversion of a value measured by gel permeation chromatography (GPC), unless otherwise noted. As the measurement conditions, the following conditions can be used. The weight-average molecular weight shown in examples which will be described later is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

In addition, a curing agent can also be used together with the resin which can be used as the binding agent, in a case of forming the magnetic layer. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the manufacturing step of the magnetic recording medium. The preferred curing agent is a thermosetting compound, polyisocyanate is suitable. For details of the polyisocyanate, descriptions disclosed in paragraphs 0124 and 0125 of JP2011-216149A can be referred to, for example. The amount of the curing agent added and used can be, for example, 0 to 80.0 parts by mass with respect to 100.0 parts by mass of the binding agent in the magnetic layer forming composition, and is preferably 50.0 to 80.0 parts by mass, from a viewpoint of improvement of hardness of the magnetic layer.

Oxide Abrasive

The magnetic recording medium includes an oxide abrasive in the magnetic layer. The oxide abrasive is a non-magnetic oxide powder having Mohs hardness exceeding 8 and is preferably a non-magnetic oxide powder having Mohs hardness equal to or greater than 9. A maximum value of Mohs hardness is 10. The oxide abrasive may be an inorganic oxide powder and an organic oxide powder, and is preferably an inorganic oxide powder. Specifically, examples of the abrasive include powders of alumina ($Al_2O_3$), titanium oxide ($TiO_2$), cerium oxide ($CeO_2$), and zirconium oxide ($ZrO_2$), and alumina powder is preferable among these. Mohs hardness of alumina is approximately 9. For alumina powder, a description disclosed in a paragraph 0021 of JP2013-229090A can also be referred to. In addition, as an index of a particle size of the oxide abrasive, a specific surface area can be used. It is thought that, as the specific surface area is great, the particle size of the primary particles of the particles configuring the oxide abrasive is small. As the oxide abrasive, an oxide abrasive in which a specific surface area measured by a Brunauer-Emmett-Teller (BET) method (hereinafter, referred to as a "BET specific surface area") is equal to or greater than 14 $m^2/g$, is preferably used. In addition, from a viewpoint of dispersibility, an oxide abrasive having a BET specific surface area equal to or smaller than 40 $m^2/g$ is preferably used. The content of the oxide abrasive in the magnetic layer is preferably 1.0 to 20.0 parts by mass and more preferably 1.0 to 10.0 parts by mass with respect to 100.0 parts by mass of the ferromagnetic hexagonal ferrite powder.

Additives

The magnetic layer includes ferromagnetic hexagonal ferrite powder, a binding agent and an oxide abrasive, and may further include one or more kinds of additives, if necessary. As the additives, the curing agent described above is used as an example. In addition, examples of the additive which can be included in the magnetic layer include a non-magnetic powder other than the oxide abrasive, a lubricant, a dispersing agent, a dispersing assistant, an antibacterial agent, an antistatic agent, and an antioxidant. As the additives, a commercially available product can be suitably selected or manufactured by a well-known method according to the desired properties, and any amount thereof can be used. For example, for the lubricant, a description disclosed in paragraphs 0030 to 0033, 0035, and 0036 of JP2016-126817A can be referred to. The lubricant may be included in the non-magnetic layer. For the lubricant which can be included in the non-magnetic layer, a description disclosed in paragraphs 0030, 0031, 0034, 0035, and 0036 of JP2016-126817A can be referred to. For the dispersing agent, a description disclosed in paragraphs 0061 and 0071 of JP2012-133837A can be referred to. The dispersing agent may be included in the non-magnetic layer. For the dispersing agent which can be included in the non-magnetic layer, a description disclosed in a paragraph 0061 of JP2012-133837A can be referred to.

In addition, as the dispersing agent, a dispersing agent for increasing dispersibility of the oxide abrasive can be used. As a compound which can function as such a dispersing agent, an aromatic hydrocarbon compound including a phenolic hydroxyl group can be used. The "phenolic hydroxyl group" is a hydroxyl group directly bonded to an aromatic ring. The aromatic ring included in the aromatic hydrocarbon compound may be a monocycle, may have a polycyclic structure, or may be a condensed ring. From a viewpoint of improving dispersibility of the abrasive, an aromatic hydrocarbon compound including a benzene ring or a naphthalene ring is preferable. In addition, the aromatic hydrocarbon compound may include a substituent other than the phenolic hydroxyl group. Examples of the substituent other than the phenolic hydroxyl group include a halogen atom, an alkyl group, an alkoxy group, an amino group, an acyl group, a nitro group, a nitroso group, and a hydroxyalkyl group, and a halogen atom, an alkyl group, an alkoxy group, an amino group, and a hydroxyalkyl group are preferable. The number of phenolic hydroxyl groups included in one molecule of the aromatic hydrocarbon compound may be one, two, three, or greater.

As a preferable aspect of the aromatic hydrocarbon compound including the phenolic hydroxyl group, a compound represented by General Formula 100 can be used.

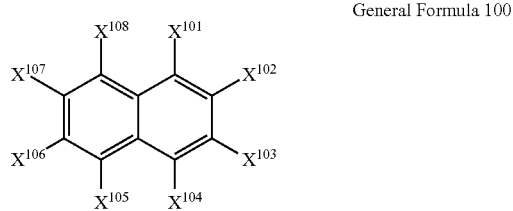

General Formula 100

[In General Formula 100, two of $X^{101}$ to $X^{108}$ are hydroxyl groups and the other six thereof each independently represent a hydrogen atom or a substituent.]

In the compound represented by General Formula 100, substituent positions of the two hydroxyl groups (phenolic hydroxyl groups) are not particularly limited.

In the compound represented by General Formula 100, two of $X^{101}$ to $X^{108}$ are hydroxyl groups (phenolic hydroxyl groups) and the other six thereof each independently represent a hydrogen atom or a substituent. In addition, among $X^{101}$ to $X^{108}$, all of the part other than the two hydroxyl groups may be a hydrogen atom or a part or all thereof may be a substituent. As the substituent, the substituent described above can be used. As the substituent other than the two hydroxyl groups, one or more phenolic hydroxyl groups may be included. From a viewpoint of improving dispersibility of the abrasive, it is preferable that the substituent other than the two hydroxyl groups of $X^{101}$ to $X^{108}$ is not a phenolic hydroxyl group. That is, the compound represented by General Formula 100 is preferably dihydroxynaphthalene or a derivative thereof, and more preferably 2,3-dihydroxynaphthalene or a derivative thereof. Examples of the preferable substituent represented by $X^{101}$ to $X^{108}$ include a halogen atom (for example, a chlorine atom or a bromine atom), an amino group, an alkyl group having 1 to 6 (preferably 1 to 4) carbon atoms, a methoxy group, an ethoxy group, an acyl group, a nitro group, a nitroso group, and a —$CH_2OH$ group.

In addition, for the dispersing agent for increasing dispersibility of the oxide abrasive, a description disclosed in paragraphs 0024 to 0028 of JP2014-179149A can be referred to.

The used amount of the dispersing agent for increasing dispersibility of the oxide abrasive can be, for example, 0.5 to 20.0 parts by mass and is preferably 1.0 to 10.0 parts by mass with respect to 100.0 parts by mass of the abrasive in a case of preparing a magnetic layer forming composition (preferably, in a case of preparing an abrasive solution as will be described later).

As the dispersing agent, a well-known dispersing agent for increasing dispersibility of ferromagnetic hexagonal ferrite powder such as a carboxyl group-containing compound or a nitrogen-containing compound can also be used. For example, the nitrogen-containing compound may primary amine represented by $NH_2R$, secondary amine represented by $NHR_2$, or tertiary amine represented by $NR_3$. As described above, R indicates any structure configuring the nitrogen-containing compound and a plurality of R may be the same as each other or different from each other. The nitrogen-containing compound may be a compound (polymer) having a plurality of repeating structures in a molecule. It is thought that a nitrogen-containing portion of the nitrogen-containing compound functioning as an adsorption portion to the surface of the particles of the ferromagnetic hexagonal ferrite powder is a reason for the nitrogen-containing compound to function as the dispersing agent. As the carboxyl group-containing compound, for example, fatty acid of oleic acid can be used. Regarding the carboxyl group-containing compound, it is thought that a carboxyl group functioning as an adsorption portion to the surface of the particles of the ferromagnetic hexagonal ferrite powder is a reason for the carboxyl group-containing compound to function as the dispersing agent. It is also preferable to use the carboxyl group-containing compound and the nitrogen-containing compound in combination. The amount of these dispersing agents used can be suitably set.

As the non-magnetic powder other than the oxide abrasive included in the magnetic layer, non-magnetic powder which can contribute to formation of projections on the surface of the magnetic layer to control of friction properties (hereinafter, also referred to as a "projection formation agent"). As the projection formation agent, various non-magnetic powders generally used as the projection formation agent in the magnetic layer can be used. These may be powder of inorganic substance (inorganic powder) or powder of organic substance (organic powder). In one aspect, from a viewpoint of homogenization of friction properties, particle size distribution of the projection formation agent is not polydispersion having a plurality of peaks in the distribution and is preferably monodisperse showing a single peak. From a viewpoint of availability of monodisperse particles, the projection formation agent is preferably inorganic powder. Examples of the inorganic powder include powder of metal oxide, metal carbonate, metal sulfate, metal nitride, metal carbide, and metal sulfide. The particles configuring the projection formation agent (non-magnetic powder other than the oxide abrasive) are preferably colloid particles and more preferably inorganic oxide colloid particles. In addition, from a viewpoint of availability of monodisperse particles, the inorganic oxide configuring the inorganic oxide colloid particles are preferably silicon dioxide (silica). The inorganic oxide colloid particles are more preferably colloidal silica (silica colloid particles). In the invention and the specification, the "colloid particles" are particles which are not precipitated and dispersed to generate a colloidal dispersion, in a case where 1 g of the particles is added to 100 mL of at least one organic solvent of methyl ethyl ketone, cyclohexanone, toluene, or ethyl acetate, or a mixed solvent including two or more kinds of the solvent described above at a random mixing ratio. In another aspect, the projection formation agent is preferably carbon black. An average particle size of the projection formation agent can be, for example, 30 to 300 nm and is preferably 40 to 200 nm. In addition, from a viewpoint that the projection formation agent exhibits the functions thereof in more excellent manner, the content of the projection formation agent in the magnetic layer is preferably 1.0 to 4.0 parts by mass and more preferably 1.5 to 3.5 parts by mass with respect to 100.0 parts by mass of the ferromagnetic hexagonal ferrite powder.

As described above, in order to control the base friction to be equal to or smaller than 0.30, other non-magnetic powders can also be used in addition to the oxide abrasive and the projection formation agent described above. For such non-magnetic powder, various non-magnetic powders normally used in the non-magnetic layer can be used. Specifically, the non-magnetic layer is as described later. As more preferred non-magnetic powder, red oxide can be used. The Mohs hardness of red oxide is approximately 6.

It is preferable that the other non-magnetic powder described above has an average particle size greater than that of the ferromagnetic hexagonal ferrite powder, in the same manner as the ferromagnetic hexagonal ferrite powder used with the ferromagnetic hexagonal ferrite powder included with the largest proportion described above. This is because the base friction may decrease due to the protruded component formed of the other non-magnetic powder on the base portion. From a viewpoint, difference between an average particle size of the ferromagnetic hexagonal ferrite powder and an average particle size of the other non-magnetic powder used therewith, acquired as "(latter average particle size)−(former average particle size)" is preferably 10 to 80 nm and more preferably 10 to 50 nm. In a case of using two or more kinds of ferromagnetic hexagonal ferrite powders having different average particle sizes as the ferromagnetic hexagonal ferrite powder, the ferromagnetic hexagonal ferrite powder used for calculating a difference between the average particle size thereof and the average particle size of the other non-magnetic hexagonal ferrite powder is a ferromagnetic hexagonal ferrite powder with the largest proportion among two or more kinds of ferromagnetic hexagonal ferrite powders based on mass. As the other non-magnetic powder, it is also possible to use two or more kinds of non-magnetic powders having different average particle sizes. In this case, it is preferable that an average particle size of at least one of non-magnetic powder of the two or more of non-magnetic powders satisfies the difference described above, it is more preferable that average particle sizes of more kinds of non-magnetic powders satisfy the difference described above, and it is even more preferable that average particle sizes of all of the non-magnetic powders satisfy the difference described above, with respect to the average particle size of the ferromagnetic hexagonal ferrite powder.

From a viewpoint of controlling base friction, a mixing ratio of the ferromagnetic hexagonal ferrite powder to the other non-magnetic powder (in a case of using two or more kinds of non-magnetic powders having different average particle sizes as other non-magnetic powder, the total thereof), is preferably 90.0:10.0 (former:latter) to 99.9:0.1 and more preferably 95.0:5.0 to 99.5:0.5 based on mass.

The magnetic layer described above can be provided on the surface of the non-magnetic support directly or indirectly through the non-magnetic layer.

Non-Magnetic Layer

Next, the non-magnetic layer will be described.

The magnetic recording medium may include a magnetic layer directly on a surface of a non-magnetic support, or may include a non-magnetic layer including a non-magnetic powder and a binding agent between the non-magnetic support and the magnetic layer. The non-magnetic powder included in the non-magnetic layer may be inorganic powder or organic powder. In addition, carbon black and the like can be used. Examples of the inorganic powder include powder of metal, metal oxide, metal carbonate, metal sulfate, metal nitride, metal carbide, and metal sulfide. These non-magnetic powder can be purchased as a commercially available product or can be manufactured by a well-known method. For details thereof, descriptions disclosed in paragraphs 0036 to 0039 of JP2010-24113A can be referred to. A content (filling percentage) of the non-magnetic powder in the non-magnetic layer is preferably 50% to 90% by mass and more preferably 60% to 90% by mass.

In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

In the invention and the specification, the non-magnetic layer also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m(100 Oe), or a layer having a residual magnetic flux density equal to or smaller than 10 mT and coercivity equal to or smaller than 7.96 kA/m(100 Oe). It is preferable that the non-magnetic layer does not have a residual magnetic flux density and coercivity.

Non-Magnetic Support

Next, the non-magnetic support (hereinafter, also simply referred to as a "support") will be described.

As the non-magnetic support, well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or heat treatment may be performed with respect to these supports in advance.

Back Coating Layer

The magnetic recording medium can also include a back coating layer including non-magnetic powder and a binding agent on a surface of the non-magnetic support opposite to the surface provided with the magnetic layer. The back coating layer preferably includes any one or both of carbon black and inorganic powder. For the binding agent included in the back coating layer and various additives which can be randomly included therein, a well-known technology regarding the back coating layer can be applied, and a well-known technology regarding the process of the magnetic layer and/or the non-magnetic layer can also be applied. For example, for the back coating layer, descriptions disclosed in paragraphs 0018 to 0020 of JP2006-331625A and page 4, line 65, to page 5, line 38, of U.S. Pat. No. 7,029,774 can be referred to.

Various Thicknesses

Thicknesses of the non-magnetic support and each layer of the magnetic recording medium will be described below.

A thickness of the non-magnetic support is, for example, 3.0 to 80.0 μm, preferably 3.0 to 50.0 μm, and more preferably 3.0 to 10.0 μm.

A thickness of the magnetic layer can be optimized according to a saturation magnetization amount of a magnetic head used, a head gap length, a recording signal band, and the like. The thickness of the magnetic layer is generally 10 nm to 100 nm, preferably 20 to 90 nm, and more preferably 30 to 70 nm, from a viewpoint of realization of high-density recording. The magnetic layer may be at least one layer, or the magnetic layer can be separated to two or more layers having different magnetic properties, and a configuration regarding a well-known multilayered magnetic layer can be applied. A thickness of the magnetic layer which is separated into two or more layers is a total thickness of the layers.

A thickness of the non-magnetic layer is, for example, equal to or greater than 50 nm, preferably equal to or greater than 70 nm, and more preferably equal to or greater than 100 nm. Meanwhile, the thickness of the non-magnetic layer is preferably equal to or smaller than 800 nm and more preferably equal to or smaller than 500 nm.

A thickness of the back coating layer is preferably equal to or smaller than 0.9 μm and more preferably 0.1 to 0.7 μm.

The thicknesses of various layers of the magnetic recording medium and the non-magnetic support can be acquired by a well-known film thickness measurement method. As an example, a cross section of the magnetic recording medium in a thickness direction is, for example, exposed by a well-known method of ion beams or microtome, and the exposed cross section is observed with an electron microscope such as a scanning electron microscope or a transmission electron microscope. In the cross section observation, various thicknesses can be acquired as a thickness acquired at one portion of the cross section in the thickness direction, or an arithmetical mean of thicknesses acquired at a plurality of portions of two or more portions, for example, two portions which are randomly extracted. In addition, the thickness of each layer may be acquired as a designed thickness calculated according to the manufacturing conditions.

Manufacturing Step

Preparation of Each Layer Forming Composition

Steps of preparing the composition for forming the magnetic layer, the non-magnetic layer, or the back coating layer generally include at least a kneading step, a dispersing step, and a mixing step provided before and after these steps, if necessary. Each step may be divided into two or more stages. The components used in the preparation of each layer forming composition may be added at an initial stage or in a middle stage of each step. As the solvent, one kind or two or more kinds of various solvents generally used for manufacturing a coating type magnetic recording medium can be used. For the solvent, a description disclosed in a paragraph 0153 of JP2011-216149A can be referred to, for example. In addition, each component may be separately added in two or more steps. For example, the binding agent may be separately added in the kneading step, the dispersing step, and a mixing step for adjusting a viscosity after the dispersion. In order to manufacture the magnetic recording medium, a well-known manufacturing technology of the related art can be used in various steps. In the kneading step, an open kneader, a continuous kneader, a pressure kneader, or a kneader having a strong kneading force such as an extruder is preferably used. For details of these kneading processes, descriptions disclosed in JP1989-106338A (JP-H01-106338A) and JP1989-79274A (JP-H01-79274A) can be referred to. As a disperser, a well-known disperser can be used. The filtering may be performed by a well-known method in any stage for preparing each layer forming composition. The filtering can be performed by using a filter, for example. As the filter used in the filtering, a filter having a hole diameter of 0.01 to 3 μm (for example, filter made of glass fiber or filter made of polypropylene) can be used, for example.

As described above, in one aspect, regarding the control of the base friction, a magnetic recording medium can be manufactured by using two or more kinds of ferromagnetic hexagonal ferrite powders having different average particle sizes. That is, the magnetic layer can be formed with first ferromagnetic hexagonal ferrite powder, and one or more kinds of ferromagnetic hexagonal ferrite powder having an average particle size greater than that of the first ferromagnetic hexagonal ferrite powder, as ferromagnetic hexagonal ferrite powder. As preferred aspects of a forming method of such a magnetic layer, aspects of the following (1) to (3) can be used. A combination of two or more aspects described below is a more preferred aspect of the forming method of the magnetic layer. The first ferromagnetic hexagonal ferrite powder is one kind of ferromagnetic hexagonal ferrite powder among the two or more kinds of ferromagnetic hexagonal ferrite powders and is preferably ferromagnetic hexagonal ferrite powder with the largest proportion described above based on mass.

(1) An average particle size of the first ferromagnetic hexagonal ferrite powder is 10 to 80 nm.

(2) A difference between an average particle size of the ferromagnetic hexagonal ferrite powder having an average particle size greater than that of the first ferromagnetic hexagonal ferrite powder, and the average particle size of the first ferromagnetic hexagonal ferrite powder is 10 to 50 nm.

(3) A mixing ratio of the first ferromagnetic hexagonal ferrite powder to the ferromagnetic hexagonal ferrite powder having an average particle size greater than that of the first ferromagnetic hexagonal ferrite powder is 90.0:10.0 (former:latter) to 99.9:0.1 based on mass.

In another aspect, a magnetic recording medium can also be manufactured by using non-magnetic powder other than the oxide abrasive and the projection formation agent, as the non-magnetic powder of the magnetic layer. That is, the magnetic layer can be formed with the other non-magnetic powder. As preferred aspects of a forming method of such a magnetic layer, aspects of the following (4) to (6) can be used. A combination of two or more aspects described below is a more preferred aspect of the forming method of a magnetic layer.

(4) An average particle size of the other non-magnetic powder is greater than an average particle size of the ferromagnetic hexagonal ferrite powder.

(5) A difference between the average particle size of the ferromagnetic hexagonal ferrite powder and the average particle size of the other non-magnetic powder is 10 to 80 nm.

(6) A mixing ratio of the ferromagnetic hexagonal ferrite powder to the other non-magnetic powder is 90.0:10.0 (former:latter) to 99.9:0.1 based on mass.

The value of the FIB abrasive diameter tends to decrease, as the oxide abrasive is present in a finer state in the magnetic layer. As means for causing the oxide abrasive to be present in a finer state in the magnetic layer, a dispersing agent capable of increasing dispersibility of the oxide abrasive can be used, as described above. In addition, in order to cause the oxide abrasive to be present in a finer state in the magnetic layer, it is preferable that an abrasive having a small particle size is used, aggregation of the abrasive is prevented, and uneven distribution is prevented to disperse the abrasive in the magnetic layer evenly. As means for this, a method of reinforcing dispersion conditions of the oxide abrasive in a case of preparing the magnetic layer forming composition is used. For example, dispersing the oxide abrasive separately from the ferromagnetic hexagonal ferrite powder is one aspect of the reinforcement of the dispersion conditions. The separate dispersion is specifically a method of preparing a magnetic layer forming composition through a step of mixing an abrasive solution including an oxide abrasive and a solvent (here, ferromagnetic hexagonal ferrite powder is not substantially included) with a magnetic liquid including the ferromagnetic hexagonal ferrite powder, a solvent, and a binding agent. By performing the mixing after dispersing the oxide abrasive separately from the ferromagnetic hexagonal ferrite powder, it is possible to increase dispersibility of the oxide abrasive in the magnetic layer forming composition. The expression "ferromagnetic powder is not substantially included" means that the ferromagnetic hexagonal ferrite powder is not added as a constituent element of the abrasive solution, and a small amount of the ferromagnetic hexagonal ferrite powder mixed as impurities without any intention is allowed. In addition to the separate dispersion or with the separate dispersion, means such as the dispersion process performed for a long period of time, the use of dispersion medium having a small size (for example, a decrease in diameter of dispersion beads in the beads dispersion), a high degree of filling of the dispersion medium in the disperser can be randomly combined to reinforce the dispersion conditions. For the disperser and the dispersion medium, a commercially available product can be used. In addition, a centrifugal separation process of the abrasive solution contributes to the oxide abrasive present in the magnetic layer in a finer state, by removing particles having a size greater than an average particle size and/or aggregated particles from the particles configuring the oxide abrasive. The centrifugal separation process can be performed by a commercially available centrifugal separator. In addition, the filtering of the abrasive solution performed by using a filter or the like is preferable for removing a coarse aggregate of the aggregated particles configuring the oxide abrasive. The removal of such coarse aggregate can contribute to the oxide abrasive present in the magnetic layer in a finer state. For example, the filtering by using a filter having a smaller hole diameter can contribute to the oxide abrasive present in the magnetic layer in a finer state. In addition, by adjusting various process conditions (for example, stirring conditions, dispersion process conditions, filtering conditions, and the like) after mixing the abrasive solution with the component for preparing the magnetic layer forming composition such as the ferromagnetic hexagonal ferrite powder or the like, it is possible to increase dispersibility of the oxide abrasive in the magnetic layer forming composition. This can also contribute to the oxide abrasive present in the magnetic layer in a finer state. However, in a case where the oxide abrasive is present in the magnetic layer in an extremely finer state, the FIB abrasive diameter may be smaller than 0.04 μm, and therefore, it is preferable that various conditions for preparing the abrasive solution are adjusted so as to realize the FIB abrasive diameter of 0.04 μm to 0.08 μm.

Regarding the dispersion process of the magnetic layer forming composition, as described above, it is preferable to prevent the occurrence of chipping. In order for this, it is preferable to perform the dispersion process of the ferromagnetic hexagonal ferrite powder by a dispersion process having two stages, in which a coarse aggregate of the ferromagnetic hexagonal ferrite powder is crushed by the dispersion process in a first stage, and the dispersion process in a second stage, in which a collision energy applied to particles of the ferromagnetic hexagonal ferrite powder due to collision with the dispersion beads is smaller than that in the first dispersion process, is performed, in the step of preparing the magnetic layer forming composition. According to such a dispersion process, it is possible to improve dispersibility of the ferromagnetic hexagonal ferrite powder and prevent the occurrence of chipping.

As a preferred aspect of the dispersion process having two stages, a dispersion process including a first stage of obtaining a dispersion liquid by performing the dispersion process of the ferromagnetic hexagonal ferrite powder, the binding agent, and the solvent under the presence of first dispersion beads, and a second stage of performing the dispersion process of the dispersion liquid obtained in the first stage under the presence of second dispersion beads having smaller bead diameter and density than those of the first dispersion beads can be used. Hereinafter, the dispersion process of the preferred aspect described above will be further described.

In order to increase the dispersibility of the ferromagnetic hexagonal ferrite powder, the first stage and the second stage are preferably performed as the dispersion process before mixing the ferromagnetic hexagonal ferrite powder and other powder components. For example, the first stage and the second stage are preferably performed as a dispersion process of a solution (magnetic liquid) including ferromagnetic hexagonal ferrite powder, a binding agent, a solvent, and randomly added additives, before mixing the oxide abrasive (preferably before mixing the oxide abrasive and the projection formation agent described above).

A bead diameter of the second dispersion bead is preferably equal to or smaller than 1/100 and more preferably equal to or smaller than 1/500 of a bead diameter of the first dispersion bead. The bead diameter of the second dispersion bead can be, for example, equal to or greater than 1/10,000 of the bead diameter of the first dispersion bead. However, there is no limitation to this range. The bead diameter of the second dispersion bead is, for example, preferably 80 to 1,000 nm. Meanwhile, the bead diameter of the first dispersion bead can be, for example, 0.2 to 1.0 mm.

The bead diameter of the invention and the specification is a value measured by the same method as the measurement method of the average particle size of the powder described above.

The second stage is preferably performed under the conditions in which the amount of the second dispersion beads is equal to or greater than 10 times of the amount of the ferromagnetic hexagonal ferrite powder, and is more preferably performed under the conditions in which the amount of the second dispersion beads is 10 times to 30 times of the amount of the ferromagnetic hexagonal ferrite powder, based on mass.

Meanwhile, the amount of the dispersion beads in the first stage is preferably in the range described above.

The second dispersion beads are beads having lower density than that of the first dispersion beads. The "density" is obtained by dividing the mass (unit: g) of the dispersion beads by volume (unit: $cm^3$). The measurement is performed by the Archimedes method. The density of the second dispersion beads is preferably equal to or lower than 3.7 $g/cm^3$ and more preferably equal to or lower than 3.5 $g/cm^3$. The density of the second dispersion beads may be, for example, equal to or higher than 2.0 $g/cm^3$ or may be lower than 2.0 $g/cm^3$. As the preferred second dispersion beads from a viewpoint of density, diamond beads, silicon carbide beads, or silicon nitride beads can be used, and as preferred second dispersion beads from a viewpoint of density and hardness, diamond beads can be used.

Meanwhile, as the first dispersion beads, dispersion beads having density exceeding 3.7 $g/cm^3$ are preferable, dispersion beads having density equal to or higher than 3.8 $g/cm^3$ are more preferable, and dispersion beads having density equal to or higher than 4.0 $g/cm^3$ are even more preferable. The density of the first dispersion beads may be, for example, equal to or smaller than 7.0 $g/cm^3$ or may exceed 7.0 $g/cm^3$. As the first dispersion beads, zirconia beads or alumina beads are preferably used, and zirconia beads are more preferably used.

The dispersion time is not particularly limited and may be set in accordance with the kind of a disperser used.

Coating Step

The magnetic layer can be formed by directly applying the magnetic layer forming composition onto the surface of the non-magnetic support or performing multilayer coating of the magnetic layer forming composition with the non-magnetic layer forming composition in order or at the same time. The back coating layer can be formed by applying the back coating layer forming composition to the surface side of the non-magnetic support opposite to a surface side provided with the magnetic layer (or to be provided with the magnetic layer). For details of the coating for forming each layer, a description disclosed in a paragraph 0066 of JP2010-231843A can be referred to.

Other Steps

For details of various other steps for manufacturing the magnetic recording medium, descriptions disclosed in paragraphs 0067 to 0070 of JP2010-231843A can be referred to. It is preferable that the coating layer of the magnetic layer forming composition is subjected to an alignment process, while the coating layer is wet (not dried). For the alignment process, various well-known technologies such as a description disclosed in a paragraph 0067 of JP2010-231843A can be used. As described above, it is preferable to perform the homeotropic alignment process as the alignment process, from a viewpoint of controlling the XRD intensity ratio. Regarding the alignment process, the above description can also be referred to.

As described above, it is possible to obtain the magnetic recording medium according to one aspect of the invention. However, the manufacturing method described above is merely an example, values of the XRD intensity ratio, the vertical squareness ratio, the base friction, and the FIB abrasive diameter can be controlled to be in respective ranges described above by any means capable of adjusting the values thereof, and such an aspect is also included in the invention.

The magnetic recording medium according to one aspect of the invention can be a tape-shaped magnetic recording medium (magnetic tape) or can also be a disk-shaped magnetic recording medium (magnetic disk). For example, the magnetic tape is normally accommodated in a magnetic tape cartridge and the magnetic tape cartridge is mounted in a magnetic recording and reproducing device. A servo pattern can also be formed in the magnetic tape by a well-known method, in order to allow head tracking servo to be performed in the magnetic recording and reproducing device.

Magnetic Recording and Reproducing Device

One aspect of the invention relates to a magnetic recording and reproducing device including the magnetic recording medium and a magnetic head.

In the invention and the specification, the "magnetic recording and reproducing device" means a device capable of performing at least one of the recording of information on the magnetic recording medium or the reproducing of information recorded on the magnetic recording medium. Such a device is generally called a drive. The magnetic head included in the magnetic recording and reproducing device can be a recording head capable of performing the recording of information on the magnetic recording medium, or can be a reproducing head capable of performing the reproducing of information recorded on the magnetic recording medium. In addition, in one aspect, the magnetic recording and reproducing device can include both of a recording head and a reproducing head as separate magnetic heads. In another aspect, the magnetic head included in the magnetic recording and reproducing device can also have a configuration of including both of a recording element and a reproducing element in one magnetic head. In addition, the magnetic head which performs the recording of information and/or the reproducing of information may include a servo pattern reading element. Alternatively, as a head other than the magnetic head which performs the recording of information and/or the reproducing of information, a magnetic head (servo head) including a servo pattern reading element may be included in the magnetic recording and reproducing device.

In the magnetic recording and reproducing device, the recording of information on the magnetic recording medium and the reproducing of information recorded on the magnetic recording medium can be performed by bringing the surface of the magnetic layer of the magnetic recording medium into contact with the magnetic head and sliding. The magnetic recording and reproducing device may include the magnetic recording medium according to one aspect of the invention and well-known technologies can be applied for other configurations.

The magnetic recording medium according to one aspect of the invention can exhibit excellent electromagnetic conversion characteristics in the magnetic recording and reproducing device. That is, in the magnetic recording and reproducing device, the information recorded on the magnetic recording medium according to one aspect of the invention can be reproduced at a high SNR. In addition, in the magnetic recording and reproducing device, the GTT can be performed while changing the magnetic recording medium with a new product. In this GTT, according to the magnetic recording medium according to one aspect of the invention, it is possible to prevent occurrence of the head element chipping. The element for preventing the occurrence of the head element chipping can be one or more elements selected from the group consisting of a reproducing element, recording element, and a servo pattern reading element, and two or more elements can also be used. The reproducing element is preferably a magnetoresistive (MR) element capable of reading information recorded on the magnetic recording medium with excellent sensitivity. In addition, the MR element is also preferable as the servo pattern reading element. As a head (MR head) including the MR element as the reproducing element and/or the servo pattern reading element, various well-known MR heads can be used.

EXAMPLES

Hereinafter, the invention will be described with reference to examples. However, the invention is not limited to aspects shown in the examples. "Parts" and "%" in the following description mean "parts by mass" and "% by mass", unless otherwise noted. In addition, steps and evaluations described below are performed in an environment of an atmosphere temperature of 23° C.±1° C., unless otherwise noted. Further, "eq" described below is an equivalent which is a unit which cannot be converted into the SI unit system.

Example 1

A list of each layer forming composition is shown below.
Preparation of Abrasive Solution The amount of 2,3-dihydroxynaphthalene (manufactured by Tokyo Chemical Industry Co., Ltd.) shown in condition C of Table 1, 31.3 parts of a 32% solution (solvent is a mixed solvent of methyl ethyl ketone and toluene) of a polyester polyurethane resin having a SO$_3$Na group as a polar group (UR-4800 (amount of a polar group: 80 meq/kg) manufactured by Toyobo Co., Ltd.), and 570.0 parts of a mixed solution of methyl ethyl ketone and cyclohexanone (mass ratio of 1:1) as a solvent were mixed in 100.0 parts of an oxide abrasive (alumina powder) shown in condition C of Table 1, and dispersed in the presence of zirconia beads (bead diameter: 0.1 mm) by a paint shaker for a period of time shown in condition C of Table 1 (bead dispersion time). After the dispersion, the centrifugal separation process of a dispersion liquid obtained by separating the dispersion liquid from the beads by mesh was performed. The centrifugal separation process was performed by using CS150GXL manufactured by Hitachi, Ltd. (rotor used is S100AT6 manufactured by Hitachi, Ltd.) as a centrifugal separator at a rotation per minute (rpm) shown in the condition C of Table 1, for a period of time (centrifugal separation time) shown in the condition C of Table 1. After that, the filtering was performed by using a filter having a hole diameter shown in the condition C of Table 1, and an alumina dispersion (abrasive solution) was obtained.
Preparation of Magnetic Layer Forming Composition
Magnetic Liquid
Plate-shaped ferromagnetic hexagonal ferrite powder (M-type barium ferrite): 100.0 parts Two kinds of ferromagnetic hexagonal ferrite powders below are used
    Ferromagnetic hexagonal ferrite powder (1)
    Average particle size and amount used: see Table 2
    Ferromagnetic hexagonal ferrite powder (2)
    Average particle size and amount used: see Table 2
Oleic acid: 2.0 parts
A vinyl chloride copolymer (MR-104 manufactured by Zeon Corporation): 10.0 parts
SO$_3$Na group-containing polyurethane resin: 4.0 parts
    (Weight-average molecular weight: 70,000, SO$_3$Na group: 0.07 meq/g)
An amine-based polymer (DISPERBYK-102 manufactured by BYK Additives & Instruments): 6.0 parts
Methyl ethyl ketone: 150.0 parts
Cyclohexanone: 150.0 parts
Abrasive Solution
Abrasive solution described above: 6.0 parts
Projection Formation Agent Liquid (Silica Sol)
Colloidal silica: 2.0 parts
    (Average particle size: 80 nm)
Methyl ethyl ketone: 8.0 parts
Other components
Stearic acid: 3.0 parts
Stearic acid amide: 0.3 parts
Butyl stearate: 6.0 parts
Methyl ethyl ketone: 110.0 parts
Cyclohexanone: 110.0 parts
Polyisocyanate (CORONATE (registered trademark) L manufactured by Tosoh Corporation): 3.0 parts
Preparation Method A dispersion liquid A was prepared by dispersing (first stage) various components of the magnetic liquid with a batch type vertical sand mill by using zirconia beads having a bead diameter of 0.5 mm (first dispersion beads, density of 6.0 g/cm$^3$) for 24 hours, and then performing filtering with a filter having a hole diameter of 0.5 μm. The used amount of zirconia beads was 10 times of the amount of the ferromagnetic hexagonal ferrite powder based on mass.

After that, a dispersion liquid (dispersion liquid B) was prepared by dispersing (second stage) dispersion liquid A with a batch type vertical sand mill by using diamond beads having a bead diameter shown in Table 2 (second dispersion beads, density of 3.5 g/cm$^3$) for a period of time shown in Table 2, and then separating diamond beads by using a centrifugal separator. The magnetic liquid is the dispersion liquid B obtained as described above.

The magnetic liquid, the abrasive solution, the projection formation agent liquid, and the other components were introduced in a dissolver stirrer and stirred at a circumferential speed of 10 m/sec for a period of time shown in the condition C of Table 1 (stirring time). After that, a ultrasonic dispersion process was performed at a flow rate of 7.5 kg/min with a flow type ultrasonic disperser for a period of time shown in the condition C of Table 1 (ultrasonic dispersion time), and filtering with a filter having a hole diameter shown in the condition C of Table 1 was performed for the number of times shown in the condition C of Table 1, thereby preparing the magnetic layer forming composition.
Preparation of Non-Magnetic Layer Forming Composition A non-magnetic layer forming composition was prepared by dispersing various components of the non-magnetic layer forming composition with a batch type vertical sand mill by using zirconia beads having a bead diameter of 0.1 mm for 24 hours, and then performing filtering with a filter having a hole diameter of 0.5 µm.

Non-magnetic inorganic powder: α-iron oxide: 100.0 parts
  (Average particle size: 10 nm, BET specific surface area: 75 m²/g)
Carbon black: 25.0 parts
  (Average particle size: 20 nm)
A SO₃Na group-containing polyurethane resin: 18.0 parts
  (Weight-average molecular weight: 70,000, content of SO₃Na group: 0.2 meq/g)
Stearic acid: 1.0 parts
Cyclohexanone: 300.0 parts
Methyl ethyl ketone: 300.0 parts Preparation of Back Coating Layer Forming Composition Components among various components of the back coating layer forming composition except a lubricant (stearic acid and butyl stearate), polyisocyanate, and 200.0 parts of cyclohexanone were kneaded and diluted by an open kneader, and subjected to a dispersion process of 12 passes, with a transverse beads mill disperser and zirconia beads having a bead diameter of 1 mm, by setting a bead filling percentage as 80 volume %, a circumferential speed of rotor distal end as 10 m/sec, and a retention time for 1 pass as 2 minutes. After that, the remaining components were added and stirred with a dissolver, the obtained dispersion liquid was filtered with a filter having a hole diameter of 1 µm and a back coating layer forming composition was prepared.

Non-magnetic inorganic powder: α-iron oxide: 80.0 parts
  (Average particle size: 0.15 µm, BET specific surface area: 52 m²/g)
Carbon black: 20.0 parts
  (Average particle size: 20 nm)
A vinyl chloride copolymer: 13.0 parts
A sulfonic acid salt group-containing polyurethane resin: 6.0 parts
Phenylphosphonic acid: 3.0 parts
Cyclohexanone: 155.0 parts
Methyl ethyl ketone: 155.0 parts
Stearic acid: 3.0 parts
Butyl stearate: 3.0 parts
Polyisocyanate: 5.0 parts
Cyclohexanone: 200.0 parts Manufacturing of Magnetic Tape The non-magnetic layer forming composition prepared as described above was applied to a surface of a support made of polyethylene naphthalate having a thickness of 5.0 µm so that the thickness after the drying becomes 100 nm and was dried to form a non-magnetic layer. The magnetic layer forming composition prepared as described above was applied onto the surface of the formed non-magnetic layer so that the thickness after the drying becomes 70 µm and a coating layer was formed. A homeotropic alignment process was performed by applying a magnetic field having a strength shown in Table 2 in a vertical direction with respect to the surface of the coating layer, while the coating layer of the magnetic layer forming composition is wet (not dried). After that, the coating layer was dried.

After that, the back coating layer forming composition prepared as described above was applied to the surface of the support opposite to the surface where the non-magnetic layer and the magnetic layer were formed, so that the thickness after the drying becomes 0.4 µm, and was dried. A calender process (surface smoothing treatment) was performed with respect to the tape obtained as described above by a calender configured of only a metal roll, at a speed of 100 m/min, linear pressure of 300 kg/cm (294 kN/m), and by using a calender roll at a surface temperature of 90° C., and then, a heat treatment was performed in the environment of the atmosphere temperature of 70° C. for 36 hours. After the heat treatment, the slitting was performed to have a width of ½ inches (0.0127 meters), and a servo pattern was formed on the magnetic layer by a commercially available servo writer.

By doing so, a magnetic tape of Example 1 was obtained.

Examples 2 to 9 and Comparative Examples 1 to 13

A magnetic tape was manufactured in the same manner as in Example 1, except that various items shown in Table 1 and Table 2 were changed as shown in each table.

All of the oxide abrasive shown in Table 1 are alumina powder.

In Table 2, in the comparative examples in which "none" is shown in a column of the dispersion beads and a column of the time, the magnetic layer forming composition was prepared without performing the second stage in the magnetic liquid dispersion process.

In Table 2, in the examples in which "none" is shown in a column of the homeotropic alignment process magnetic field strength, the magnetic layer was formed without performing the alignment process.

The amount of the ferromagnetic hexagonal ferrite powder shown in Table 2 is content of each ferromagnetic hexagonal ferrite powder based on mass with respect to 100.0 parts by mass of a total of the ferromagnetic hexagonal ferrite powder. An average particle size of the ferromagnetic hexagonal ferrite powder shown in Table 2 is a value obtained by collecting the necessary amount from a batch of the powder used in the preparation of the magnetic tape and measuring an average particle size by the method described above. The ferromagnetic hexagonal ferrite powder after measuring the average particle size was used in the preparation of a magnetic liquid for preparing the magnetic tape.

Evaluation of Physical Properties of Magnetic Tape (1) XRD Intensity Ratio

A tape sample was cut out from the manufactured magnetic tape.

Regarding the cut-out tape sample, the surface of the magnetic layer was irradiated with X-ray by using a thin film X-ray diffraction device (Smart Lab manufactured by Rigaku Corporation), and the In-Plane XRD was performed by the method described above.

The peak intensity Int(114) of the diffraction peak of the (114) plane and the peak intensity Int(110) of the diffraction peak of a (110) plane of a hexagonal ferrite crystal structure were obtained from the X-ray diffraction spectra obtained by the In-Plane XRD, and the XRD intensity ratio (Int(110)/Int(114)) was calculated.

(2) Vertical Squareness Ratio

A vertical squareness ratio of each manufactured magnetic tape was obtained by the method described above using a vibrating sample magnetometer (manufactured by Toei Industry Co., Ltd.).

(3) Base Friction

First, marking was performed on a measurement surface with a laser marker in advance, and an atomic force microscope (AFM) image of a portion separated from the mark by a certain distance (approximately 100 µm) was observed. The observation was performed regarding an area of a visual field of 7 µm×7 µm. At this time, marking was performed on the ARM by changing a cantilever to a hard material (single crystal silicon), so as to easily capture a scanning electron microscope (SEM) image of the same portion as will be described later. All of projections having a height equal to or greater than 15 nm from the reference surface were extracted from the AFM image observed as described above. A portion in which it is determined that projections were not present, was specified as a base portion, and the base friction was measured with TI-950 type TriboIndenter manufactured by Hysitron, Inc. by the method described above.

An SEM image of the same portion as the portion observed with the AFM image was observed to obtain a component map, and it was confirmed that the extracted projections having a height equal to or greater than 15 nm from the reference surface were projections formed of alumina or colloidal silica. In the examples and the comparative examples, in the component map obtained with the SEM, alumina and colloidal silica were not confirmed in the base portion. Here, the component analysis was performed with the SEM, but the component analysis is not limited to being performed with the SEM, and can be performed by a well-known method such as energy dispersive X-ray spectrometry (EDS) or auger electron spectroscopy (AES).

(4) FIB Abrasive Diameter

The FIB abrasive diameter of each manufactured magnetic tape was obtained by the following method.

As a focused ion beam device, MI4050 manufactured by Hitachi High-Technologies Corporation was used, and the image analysis software, ImageJ which is free software was used.

(i) Acquiring of Secondary Ion Image

The surface of the back coating layer of the sample for measurement cut out from each manufactured magnetic tape was bonded to an adhesive layer of a commercially available carbon double-sided tape for SEM measurement (double-sided tape in which a carbon film is formed on a base material formed of aluminum). An adhesive layer of this double-sided tape on a surface opposite to the surface bonded to the surface of the back coating layer was bonded to a sample table of the focused ion beam device. By doing so, the sample for measurement was disposed on the sample table of the focused ion beam device so that the surface of the magnetic layer faces upwards.

Without performing the coating process before the imaging, the beam setting of the focused ion beam device was set so that an acceleration voltage is 30 kV, a current value is 133 pA, a beam size is 30 nm, and a brightness is 50%, and an SI signal was detected by a secondary ion detector. ACB was carried out at three spots on a non-imaged region of the surface of the magnetic layer to stabilize a color of the image. Then, the contrast reference value and the brightness reference value were determined. The brightness reference value as determined in the above ACB and the contrast value which was lowered by 1% from the contrast reference value as determined in the above ACB were determined as the conditions for capturing a secondary ion image. A non-imaged region of the surface of the magnetic layer was selected and imaging was performed under the conditions for capturing as determined above and at a pixel distance of 25.0 (nm/pixel). As an image capturing method, PhotoScan Dot×4_Dwell Time 15 µsec (capturing time: 1 min), and a capturing size was set as 25 µm×25 µm. By doing so, a secondary ion image of a region of the surface of the magnetic layer having a size of 25 µm×25 µm was obtained. After the scanning, the obtained secondary ion image was stored as a file format, JPEG, by ExportImage, by clicking mouse right button on the captured screen. The pixel number of the image which was 2,000 pixel×2,100 pixel was confirmed, the cross mark and the micron bar on the captured image were deleted, and an image of 2,000 pixel×2,000 pixel was obtained.

(ii) Calculation of FIB Abrasive Diameter

The image data of the secondary ion image obtained in (i) was dragged and dropped in ImageJ which is the image analysis software.

A tone of the image data was changed to 8 bit by using the image analysis software. Specifically, Image of the operation menu of the image analysis software was clicked and 8 bit of Type was selected.

For the binarization process, 250 gradations was selected as a lower limit value, 255 gradations was selected as an upper limit value, and the binarization process was executed by these two threshold values. Specifically, on the operation menu of the image analysis software, Image was clicked, Threshold of Adjust was selected, the lower limit value was selected as 250, the upper limit value was selected as 255, and then, apply was selected. Regarding the obtained image, Process of the operation menu of the image analysis software was clicked, Despeckle of Noise was selected, and Size 4.0-Infinity was set on AnalyzeParticle to remove noise components.

Regarding the binarization process image obtained as described above, AnalyzeParticle was selected from the operation menu of the image analysis software, and the number and Area (unit: Pixel) of white-shining portions on the image were obtained. The area of each white-shining portion on the image was obtained by converting Area (unit: Pixel) into the area by the image analysis software. Specifically, 1 pixel of the image obtained under the imaging conditions corresponded to 0.0125 µm, and accordingly, the area A [µm$^2$] was calculated by an expression, area A=Area pixel×0.0125^2. By using the area calculated as described above, an equivalent circle diameter L of each white-shining portion was obtained by an expression, equivalent circle diameter L=(A/π)^(½)×2=L.

The above step was performed four times at different portions (25 µm×25 µm) of the surface of the magnetic layer of the sample for measurement, and the FIB abrasive diameter was calculated from the obtained result by an expression, FIB abrasive diameter=Σ(Li)/Σi.

Evaluation of Electromagnetic Conversion Characteristics (SNR)

The electromagnetic conversion characteristics of each manufactured magnetic tape were measured with a reel tester having a width of ½ inches (0.0127 meters) to which a head was fixed, by the following method. The following recording and reproducing were performed by sliding the surface of the magnetic layer of the magnetic tape and the head.

A running speed of the magnetic tape (magnetic head/magnetic tape relative speed) was set as 4 m/sec. As a recording head, a metal-in-gap (MIG) head (gap length of 0.15 µm, track width of 1.0 µm) was used, and a recording current was set as an optimal recording current of each magnetic tape. As a reproducing head, a giant-magnetoresistive (GMR) head having an element thickness of 15 nm, a shield interval of 0.1 µm, and a lead width of 0.5 µm was used. A signal was recorded at linear recording density (300 kfci) and a reproducing signal was measured with a spectrum analyzer manufactured by Shibasoku Co., Ltd. A ratio of an output value of a carrier signal and integral noise over whole spectral range was set as an SNR. For the SNR measurement, a part of a signal which is sufficiently stabilized after running of the magnetic tape was used. The SNR was shown in Table 2 as a relative value in a case where the SNR of Comparative Example 1 was set as 0.0 dB. The unit kfci is a unit of linear recording density (cannot be converted into the unit SI).

Head Element Chipping Amount in GTT

A magnetic head (MR head) used in a tape drive of TS 1140 manufactured by IBM was attached to a reel tester, the magnetic tape having a length of 1000 m of 1 reel was caused to run for 200 passes, by setting a running speed (magnetic head/magnetic tape relative speed) as 4 m/sec while sliding the surface of the magnetic layer and the MR head.

The same running of 200 passes was repeated by replacing the magnetic tape with a new product (1,000 reels of the magnetic tape were used), and the chipping amount of the MR element of the MR head was measured by the following method.

A carbon film was vapor-deposited on the surface of the MR head including a surface slid on the surface magnetic layer by using a vacuum deposition device (JEE-4X manufactured by JEOL), and a platinum film was formed by sputtering on this carbon by using an ion sputtering device (E-1030 manufactured by Hitachi High-Technologies Corporation. After that, a cross section parallel to the sliding direction of the magnetic tape in a case of running, was exposed from the MR head by using A FIB-SEM combined machine, Helios 400S manufactured by MRFEI, and a sample for cross section observation (piece having a thickness of 100 nm) was cut out so that the MR element was included in the cross section. A distance in a vertical direction between the sliding surface of the surface of the magnetic layer and the top of the MR element was obtained by using a TEM image obtained by observing the sample for cross section observation using a transmission electron microscope (TEM) (Titan 80-300 manufactured by FBI) at an acceleration voltage of 300 kV. A difference between the obtained distance and a distance obtained by the same method regarding unused MR head was shown as the head element chipping amount in GTT in Table 2.

TABLE 1

| | Conditions | A | B | C | D | E | F |
|---|---|---|---|---|---|---|---|
| Preparation of abrasive solution | Oxide abrasive product name (manufactured by Sumitomo Chemical Co., Ltd.) | Hit80 | Hit80 | Hit80 | Hit100 | Hit70 | Hit80 |
| | Oxide abrasive BET specific surface area (m$^2$/g) | 30 | 30 | 30 | 40 | 20 | 30 |
| | Content of abrasive solution dispersing agent (2,3-dihydroxynaphthalene) | 3.0 parts | 0 part | 3.0 parts | 3.0 parts | 3.0 parts | 3.0 parts |
| | Beads dispersion time | 5 min | 60 min | 60 min | 180 min | 60 min | 180 min |
| | Centrifugal separation Rotation rate | None | 3500 rpm | 3500 rpm | 3500 rpm | 5500 rpm | 3500 rpm |
| | Centrifugal separation time | None | 4 min | 4 min | 4 min | 4 min | 4 min |
| | Filter hole diameter | 0.5 μm | 0.3 μm | 0.3 μm | 0.3 μm | 0.3 μm | 0.3 μm |
| Preparation of magnetic layer forming composition | Stirring time | 30 min | 60 min | 360 min | 360 min | 180 min | 360 min |
| | Ultrasonic dispersion time | 0.5 min | 60 min | 60 min | 60 min | 60 min | 60 min |
| | Filter hole diameter | 0.5 μm | 0.3 μm | 0.3 μm | 0.3 μm | 0.3 μm | 0.3 μm |
| | Number of times of filter process | 1 | 2 | 3 | 3 | 2 | 3 |

TABLE 2

| | Ferromagnetic hexagonal ferrite powder (1) | | Ferromagnetic hexagonal ferrite powder (2) | | Magnetic liquid dispersion process second stage | | | | Homeotropic alignment process |
|---|---|---|---|---|---|---|---|---|---|
| | | | | | Dispersion beads | | | | |
| | | | | | | | Used amount (mass of beads with respect to mass of | | |
| | Average particle size | Amount used | Average particle size | Amount used | Kind | Bead diameter | ferromagnetic hexagonal ferrite powders (1) and (2)) | Time | magnetic field strength |
| Comparative Example 1 | 22 nm | 100% | — | — | None | None | None | None | None |
| Comparative Example 2 | 22 nm | 100% | — | — | None | None | None | None | None |
| Comparative Example 3 | 22 nm | 100% | — | — | None | None | None | None | None |
| Comparative Example 4 | 22 nm | 100% | — | — | None | None | None | None | None |
| Comparative Example 5 | 22 nm | 100% | — | — | Diamond | 500 nm | 10 times | 1 h | 0.15T |
| Comparative Example 6 | 22 nm | 100% | — | — | Diamond | 500 nm | 10 times | 1 h | 0.15T |
| Comparative Example 7 | 22 nm | 100% | — | — | Diamond | 500 nm | 10 times | 1 h | 0.15T |
| Comparative Example 8 | 22 nm | 100% | — | — | Diamond | 500 nm | 10 times | 1 h | 0.15T |
| Comparative Example 9 | 22 nm | 99.0% | 60 nm | 1.0% | None | None | None | None | None |
| Comparative Example 10 | 22 nm | 99.0% | 60 nm | 1.0% | None | None | None | None | 0.15T |
| Comparative Example 11 | 22 nm | 99.0% | 60 nm | 1.0% | None | None | None | None | 0.30T |
| Comparative Example 12 | 22 nm | 99.0% | 60 nm | 1.0% | Diamond | 500 nm | 10 times | 1 h | 1.00T |

TABLE 2-continued

| | | | | | | | | | | |
|---|---|---|---|---|---|---|---|---|---|---|
| Comparative Example 13 | 22 nm | 99.0% | 60 nm | 1.0% | Diamond | 500 nm | 10 times | 1 h | None |
| Example 1 | 22 nm | 99.0% | 60 nm | 1.0% | Diamond | 500 nm | 10 times | 1 h | 0.15T |
| Example 2 | 22 nm | 99.0% | 60 nm | 1.0% | Diamond | 500 nm | 10 times | 1 h | 0.20T |
| Example 3 | 22 nm | 99.0% | 60 nm | 1.0% | Diamond | 500 nm | 10 times | 1 h | 0.30T |
| Example 4 | 22 nm | 99.0% | 60 nm | 1.0% | Diamond | 500 nm | 10 times | 1 h | 0.50T |
| Example 5 | 22 nm | 99.0% | 60 nm | 1.0% | Diamond | 500 nm | 20 times | 1 h | 0.15T |
| Example 6 | 22 nm | 99.0% | 60 nm | 1.0% | Diamond | 500 nm | 10 times | 1 h | 0.30T |
| Example 7 | 22 nm | 99.0% | 60 nm | 1.0% | Diamond | 500 nm | 10 times | 1 h | 0.30T |
| Example 8 | 22 nm | 98.8% | 60 nm | 1.2% | Diamond | 500 nm | 10 times | 1 h | 0.30T |
| Example 9 | 22 nm | 98.5% | 60 nm | 1.5% | Diamond | 500 nm | 10 times | 1 h | 0.30T |

| | Preparation condition of abrasive solution and magnetic layer forming composition | Base friction | XRD intensity ratio Int(110)/Int(114) | Vertical squareness ratio | FIB abrasive diameter | SNR (dB) | Head element chipping amount in GTT (nm) |
|---|---|---|---|---|---|---|---|
| Comparative Example 1 | A | 0.45 | 0.2 | 0.55 | 0.16 μm | 0.0 | 10.0 |
| Comparative Example 2 | B | 0.45 | 0.2 | 0.55 | 0.11 μm | 1.1 | 7.0 |
| Comparative Example 3 | C | 0.45 | 0.2 | 0.55 | 0.06 μm | 2.0 | 4.1 |
| Comparative Example 4 | D | 0.45 | 0.2 | 0.55 | 0.03 μm | 2.9 | 5.9 |
| Comparative Example 5 | C | 0.45 | 0.5 | 0.70 | 0.06 μm | 5.1 | 4.0 |
| Comparative Example 6 | A | 0.30 | 0.5 | 0.70 | 0.16 μm | 3.0 | 9.1 |
| Comparative Example 7 | B | 0.30 | 0.5 | 0.70 | 0.11 μm | 4.0 | 6.0 |
| Comparative Example 8 | D | 0.30 | 0.5 | 0.70 | 0.03 μm | 5.9 | 7.9 |
| Comparative Example 9 | C | 0.30 | 0.3 | 0.56 | 0.06 μm | 2.1 | 0.0 |
| Comparative Example 10 | C | 0.30 | 3.8 | 0.62 | 0.06 μm | 2.0 | 0.0 |
| Comparative Example 11 | C | 0.30 | 5.0 | 0.76 | 0.06 μm | 2.1 | 0.0 |
| Comparative Example 12 | C | 0.30 | 6.2 | 0.88 | 0.06 μm | 2.0 | 0.0 |
| Comparative Example 13 | C | 0.30 | 0.3 | 0.65 | 0.06 μm | 2.0 | 0.0 |
| Example 1 | C | 0.30 | 0.5 | 0.69 | 0.06 μm | 5.1 | 0.0 |
| Example 2 | C | 0.30 | 1.5 | 0.75 | 0.06 μm | 5.0 | 0.0 |
| Example 3 | C | 0.30 | 2.4 | 0.81 | 0.06 μm | 5.1 | 0.0 |
| Example 4 | C | 0.30 | 4.0 | 0.85 | 0.06 μm | 5.0 | 0.0 |
| Example 5 | C | 0.30 | 0.7 | 0.83 | 0.06 μm | 5.1 | 0.0 |
| Example 6 | E | 0.30 | 2.4 | 0.81 | 0.08 μm | 5.5 | 0.0 |
| Example 7 | F | 0.30 | 2.4 | 0.81 | 0.04 μm | 5.5 | 0.0 |
| Example 8 | C | 0.25 | 2.4 | 0.81 | 0.06 μm | 5.0 | 0.0 |
| Example 9 | C | 0.22 | 2.4 | 0.81 | 0.06 μm | 5.0 | 0.0 |

From the results shown in Table 2, it is possible to confirm that, in Examples 1 to 9 in which the XRD intensity ratio of the magnetic tape, the vertical squareness ratio, the base friction, and the FIB abrasive diameter are in the ranges described above, the reproduction can be performed at a high SNR (that is, excellent electromagnetic conversion characteristics can be exhibited) and the occurrence of the head element chipping in GTT is prevented. It is thought that, in Comparative Example 6 and Comparative Example 7, a reason of a decrease in SNR compared to that in Examples 1 to 9, is due to an increase in distance between the surface of the magnetic layer and the reproducing element and the occurrence of spacing loss, due to the coarse surface of the magnetic layer, caused by the oxide abrasive present in the magnetic layer in a state where the FIB abrasive diameter significantly exceeds 0.08 μm.

One aspect of the invention is effective in a technical field of a magnetic recording medium used as a recording medium for archive.

What is claimed is:
1. A magnetic recording medium comprising:
a non-magnetic support; and
a magnetic layer including a ferromagnetic powder and a binding agent,
wherein the ferromagnetic powder is a ferromagnetic hexagonal ferrite powder,
the magnetic layer includes an oxide abrasive,
an intensity ratio Int(110)/Int(114) of a peak intensity Int(110) of a diffraction peak of a (110) plane with respect to a peak intensity Int(114) of a diffraction peak of a (114) plane of a hexagonal ferrite crystal structure obtained by an X-ray diffraction analysis of the magnetic layer by using an In-Plane method is 0.5 to 4.0,
a vertical squareness ratio of the magnetic recording medium is 0.65 to 1.00,
a coefficient of friction measured regarding a base portion of a surface of the magnetic layer is equal to or smaller than 0.30, and an average particle diameter of the oxide abrasive obtained from a secondary ion image obtained by irradiating the surface of the magnetic layer with a focused ion beam is 0.04 μm to 0.08 μm.

2. The magnetic recording medium according to claim 1, wherein the vertical squareness ratio is 0.65 to 0.90.

3. The magnetic recording medium according to claim 1, wherein the coefficient of friction measured regarding the base portion of the surface of the magnetic layer is 0.15 to 0.30; and the coefficient of friction on the base portion is determined using a spherical indentor at a load of 100 micro-Newton and a speed of 1 micron/s on three random portions of the base portion, calculating the coefficient of friction μ from the formula μ=F/N, where F is the frictional force in Newtons and N is the normal force in Newtons, and adopting the arithmetic average of the three measured values obtained as the coefficient of friction measured on the base portion.

4. The magnetic recording medium according to claim 1, wherein the oxide abrasive is an alumina powder.

5. The magnetic recording medium according to claim 1, further comprising:

a non-magnetic layer including a non-magnetic powder and a binding agent between the non-magnetic support and the magnetic layer.

6. The magnetic recording medium according to claim 1, further comprising:

a back coating layer including a non-magnetic powder and a binding agent on a surface of the non-magnetic support opposite to a surface provided with the magnetic layer.

7. The magnetic recording medium according to claim 1, which is a magnetic tape.

8. A magnetic recording and reproducing device comprising:

a magnetic recording medium; and
a magnetic head,
wherein the magnetic recording medium is a magnetic recording medium comprising:
a non-magnetic support; and
a magnetic layer including a ferromagnetic powder and a binding agent,
wherein the ferromagnetic powder is a ferromagnetic hexagonal ferrite powder,
the magnetic layer includes an oxide abrasive,
an intensity ratio Int(110)/Int(114) of a peak intensity Int(110) of a diffraction peak of a (110) plane with respect to a peak intensity Int(114) of a diffraction peak of a (114) plane of a hexagonal ferrite crystal structure obtained by an X-ray diffraction analysis of the magnetic layer by using an In-Plane method is 0.5 to 4.0, a vertical squareness ratio of the magnetic recording medium is 0.65 to 1.00, a coefficient of friction measured regarding a base portion of a surface of the magnetic layer is equal to or smaller than 0.30, and an average particle diameter of the oxide abrasive obtained from a secondary ion image obtained by irradiating the surface of the magnetic layer with a focused ion beam is 0.04 μm to 0.08 μm.

9. The magnetic recording and reproducing device according to claim 8, wherein the magnetic head is a magnetic head including magnetoresistive element.

10. The magnetic recording and reproducing device according to claim 8, wherein the vertical squareness ratio is 0.65 to 0.90.

11. The magnetic recording and reproducing device according to claim 8, wherein the coefficient of friction measured regarding the base portion of the surface of the magnetic layer is 0.15 to 0.30; and the coefficient of friction on the base portion is determined using a spherical indentor at a load of 100 micro-Newton and a speed of 1 micron/s on three random portions of the base portion, calculating the coefficient of friction μ from the formula μ=F/N, where F is the frictional force in Newtons and N is the normal force in Newtons, and adopting the arithmetic average of the three measured values obtained as the coefficient of friction measured on the base portion.

12. The magnetic recording and reproducing device according to claim 8, wherein the oxide abrasive is an alumina powder.

13. The magnetic recording and reproducing device according to claim 8, wherein the magnetic recording medium comprises a non-magnetic layer including a non-magnetic powder and a binding agent between the non-magnetic support and the magnetic layer.

14. The magnetic recording and reproducing device according to claim 8, wherein the magnetic recording medium comprises a back coating layer including a non-magnetic powder and a binding agent on a surface of the non-magnetic support opposite to a surface provided with the magnetic layer.

15. The magnetic recording and reproducing device according to claim 8, wherein the magnetic recording medium is a magnetic tape.

\* \* \* \* \*